(12) United States Patent
Wentworth et al.

(10) Patent No.: US 8,979,435 B2
(45) Date of Patent: Mar. 17, 2015

(54) ROD PULLING AND PUSHING MACHINE FOR PIPE BURSTING

(75) Inventors: Steven W. Wentworth, Fountain Hills, AZ (US); Robert F. Crane, Oconomowoc, WI (US)

(73) Assignee: Earth Tool Company LLC, Oconomowoc, WI (US)

( * ) Notice: Subject to any disclaimer, the term of this patent is extended or adjusted under 35 U.S.C. 154(b) by 795 days.

(21) Appl. No.: 13/047,031

(22) Filed: Mar. 14, 2011

(65) Prior Publication Data

US 2011/0188943 A1 Aug. 4, 2011

Related U.S. Application Data

(63) Continuation-in-part of application No. 11/604,602, filed on Nov. 27, 2006, now Pat. No. 7,909,539, which is a continuation of application No. 10/916,117, filed on Aug. 11, 2004, now Pat. No. 7,140,806.

(51) Int. Cl.
 *F16L 1/028* (2006.01)
 *F16L 55/165* (2006.01)
 *F16L 55/18* (2006.01)

(52) U.S. Cl.
 CPC ............. *F16L 55/1658* (2013.01); *F16L 55/18* (2013.01)
 USPC ..................................................... 405/184.3

(58) Field of Classification Search
 USPC ................... 405/174, 175, 184, 184.1–184.5
 See application file for complete search history.

(56) References Cited

U.S. PATENT DOCUMENTS

| | | | |
|---|---|---|---|
| 1,295,320 | A | 2/1919 | Humphryes |
| 1,442,164 | A | 1/1923 | Ludlum et al. |
| 2,209,885 | A | 7/1940 | Hall et al. |

(Continued)

OTHER PUBLICATIONS

"Versa-Mole Utility Drill—McL-10H Guided Boring, Rock Drilling, Auger Boring System" brochure, McLaughlin Boring Systems, 2 pages, undated.

(Continued)

*Primary Examiner* — Sunil Singh
(74) *Attorney, Agent, or Firm* — Tomlinson Rust McKinstry Grable

(57) ABSTRACT

A rod pushing and pulling machine includes at least one hydraulic cylinder having a front end thereof engagable with a reaction surface at an entry opening of an existing pipeline or borehole, a spindle assembly, and a dual vise assembly. The spindle assembly includes a frame, a spindle shaft rotatably mounted in the frame, a distal end of the spindle shaft being threaded for engagement with a mating thread of a rod, a drive system for rotating the spindle shaft in threading and unthreading directions, the spindle frame being secured to a rear end of the hydraulic cylinder for pushing or pulling of a rod string engaged to the spindle shaft upon extension or retraction of the hydraulic cylinder, and a support assembly for the spindle shaft. The support assembly includes a set of roller bearings rotatably supporting the spindle shaft, a radial flange on the spindle shaft, and a load flange secured to the spindle frame positioned to engage the radial flange, whereby the radial flange comes into engagement with the load flange during pulling operation to prevent rotation of the spindle shaft during pulling operation, and leaves engagement with the load flange during pushing operation so that the spindle shaft may rotate during pushing operation supported by the roller bearings. The dual vise assembly has two pairs of separately actuable jaws positioned to grip a rod nearest the spindle shaft and a rod adjacent the rod nearest the spindle shaft.

10 Claims, 19 Drawing Sheets

(56) References Cited

U.S. PATENT DOCUMENTS

| | | | |
|---|---|---|---|
| 2,349,033 A * | 5/1944 | Elliott | 175/394 |
| 3,113,628 A | 12/1963 | Orcutt | |
| 3,451,491 A * | 6/1969 | Clelland | 173/44 |
| 3,726,506 A | 4/1973 | Vanderwaal et al. | |
| 3,834,668 A | 9/1974 | Casey | |
| 4,000,879 A | 1/1977 | Martin et al. | |
| 4,299,375 A | 11/1981 | Schosek | |
| 4,368,873 A | 1/1983 | Perry | |
| 4,434,969 A | 3/1984 | Von Ruden | |
| 4,507,019 A * | 3/1985 | Thompson | 405/184.3 |
| 4,662,606 A | 5/1987 | Akesaka | |
| 5,240,352 A | 8/1993 | Ilomaki | |
| 5,439,329 A | 8/1995 | Marron | |
| 5,520,072 A | 5/1996 | Perry | |
| 5,740,703 A | 4/1998 | Perry | |
| 6,299,382 B1 | 10/2001 | Wentworth | |
| 6,305,880 B1 | 10/2001 | Carter et al. | |
| 6,443,657 B1 | 9/2002 | Brahler | |
| 6,761,507 B2 | 7/2004 | Wentworth et al. | |
| 6,953,306 B2 * | 10/2005 | McGillis | 405/184 |
| 2003/0165360 A1 | 9/2003 | Wentworth et al. | |

OTHER PUBLICATIONS

"PL8000 Horizontal Directional Drilling Unit" brochure, Vermeer, 5 pages, undated.

* cited by examiner

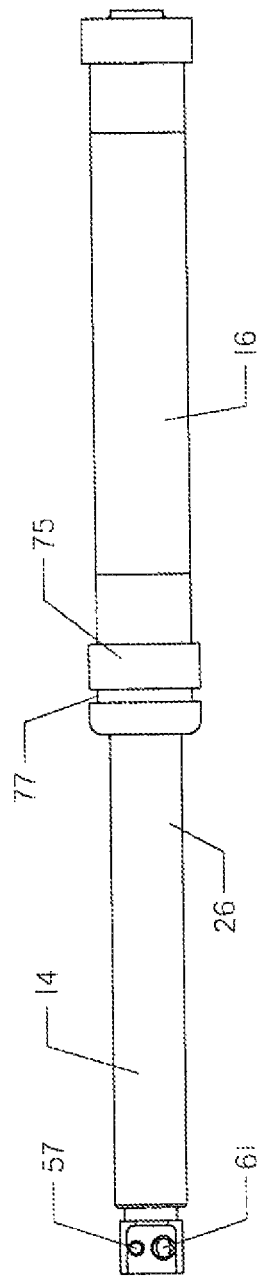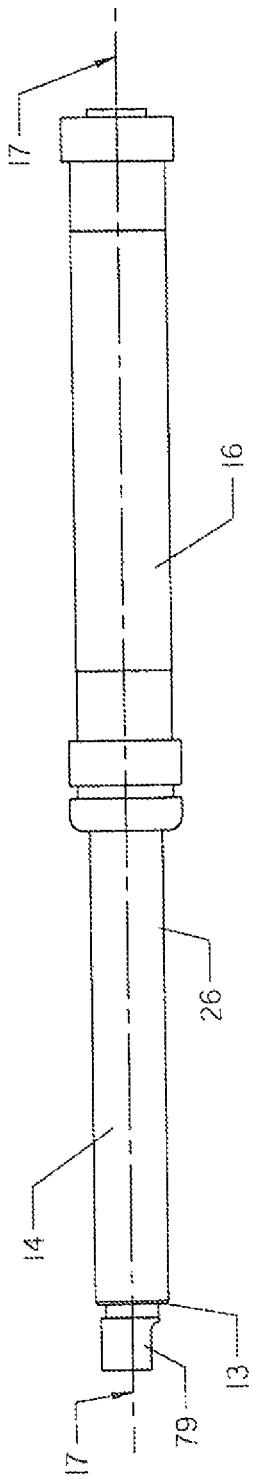
FIG. 15
FIG. 16

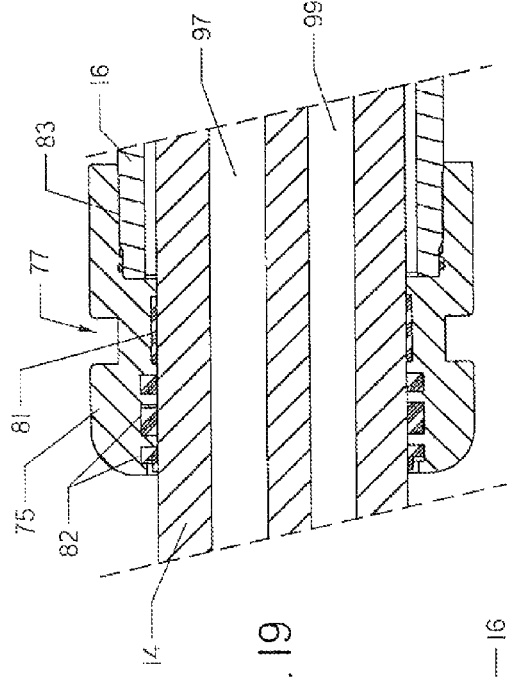
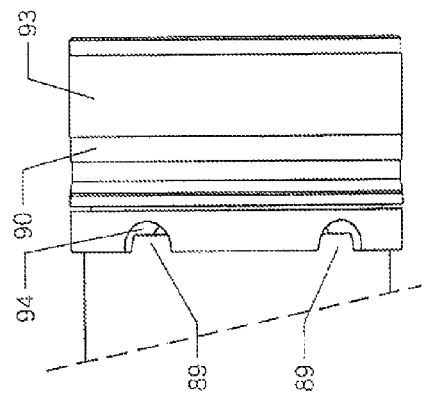
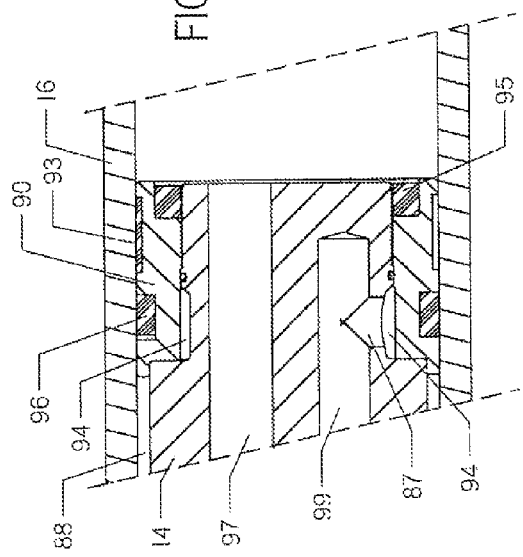
FIG. 19
FIG. 20
FIG. 21

ROD PULLING AND PUSHING MACHINE FOR PIPE BURSTING

RELATED APPLICATIONS

This application is a continuation-in-part of U.S. application Ser. No. 11/604,602, filed Nov. 27, 2006, which is a continuation of U.S. application Ser. No. 10/916,117, filed Aug. 11, 2004, now U.S. Pat. No. 7,140,806.

TECHNICAL FIELD

The invention relates to underground pipe bursting and replacement systems of the static type which operate by pushing or pulling a string of rods to which a bursting head or other tooling is attached.

BACKGROUND OF THE INVENTION

Pipe bursting is a well known process that brings enormous potential for the efficient and unobtrusive replacement of buried pipelines. Currently the there are two widely used but separate systems used to accomplish pipe bursting. The choice of the system is most often dependent on the type of utility being upgraded.

Gravity sanitary sewer systems are made up of interconnected pipes buried at depths from (4) to (40) foot beneath the surface. These systems make use of 'manholes' to provide access for maintenance and cleaning of the interiors of the pipes. It is advantageous to minimize the damage and potential need for replacement of these manholes during the bursting operation. To do that requires practicing the method described in U.S. Pat. No. 6,299,382. That method calls for use of a pneumatic actuated tool, hydraulic winch with the guide cable passed through the existing pipe, and a front-mounted bursting head. Hence, primarily for that reason, most gravity sewer pipe bursting is done with pneumatic tools.

Potable water pipes are also widely in need of replacement. These systems, by the nature of the fact that they are pressure fed and therefore independent of the effects of gravity, tend to be buried at shallow depths in moderate climates. In addition, they do not have manholes, unlike the gravity sewer systems. For these reasons, water pipes are typically burst with a machine that requires an access pit at each end of the job. In the situation where there is no manhole present, having two access pits is not necessarily disadvantageous. The machine that fits this description is called a static system. Using significant hydraulically actuated force applied through a rod string, the tooling used on a static system splits the existing pipe and expands the surrounding soil. This style of bursting has four major components:
  A. Tooling. This subsystem performs the function of cracking the pipe, expanding the adjacent soil with a conical form and a lastly provides a means of attachment of the product pipe to the rear of the tooling.
  B. Rod String. The rods, threaded at each end, are engaged end to end into a string. This string transmits the pull force between the hydraulic pulling unit and the tooling.
  C. Hydraulic power pack. This subsystem exists purely to provide pressurized hydraulic flow for operation of the pulling unit. The power pack may even be a hydraulic excavator configured to power auxiliary equipment as needed.
  D. Downhole Unit. This is generally the most complex part of the machine; it entails the greatest amount of mechanism and complication of any of the four components. Hydraulic cylinders are employed to cyclically stroke a rod engagement system. The rod engagement may be through the threaded end, or by a mechanism that grips the rod outer surface or engages features on the outer surface. The engagement system-must grip or engage the rod and apply thrust force in one direction, while sliding freely along the length of the rod in the opposite direction. This system must have the capability of being shifted relative to direction of operation so that rods may be added to, or removed from the string. An optional subsystem in downhole unit is a device to aid in the threading and unthreading of rods.

Two known pit launch static bursting machines are known commercially as the McLaughlin pit launch and the Vermeer PL8000. These are low force (10,000 lb) pulling machines having a hole approximately 8" in diameter in the front of the machine to accept small backreamers into the machine. When this is done, the vise floats (moves) with the spindle to allow the tooling to enter the machine. Since the pulling force was low, the hole did not present major problems with respect to soil entry or shoring area. With higher pulling forces, providing a hole in the front shore plate of the machine becomes problematic because soil will tend to enter the machine through the hole.

SUMMARY OF THE INVENTION

The present is directed to a method of replacing an underground pipe using a downhole machine. The method comprises thrusting a boring tool and a rod string through the underground pipe and rotating the rod string and boring tool with a rotating spindle of the downhole machine to drill through a collapsed section of the underground pipe. The boring tool is removed from the rod string after the boring tool reaches an entry opening and a bursting head is connected to the rod string. A replacement pipe is connected to the bursting head and the bursting head and replacement pipe are pulled toward the downhole machine through the interior of the underground pipe without rotation of the spindle, drill string, or bursting head.

The present invention is further directed to a method for installing a pipe underground using a downhole machine. The method comprises thrusting and rotating a boring tool and rod string through the ground to drill a pilot bore. A selected grade of the pilot bore is maintained by monitoring the location and orientation of the boring tool as the pilot bore is drilled. The location and orientation of the boring tool may be monitored using a known beacon assembly and walkover tracker system.

The boring tool is removed from the rod string after the boring tool reaches an entry opening and a bursting assembly is connected to the rod string. A pipe is connected to the bursting assembly and the bursting assembly and pipe are pulled toward the downhole machine through the ground without rotation of the rod string or bursting assembly to install the pipe at the selected grade.

The present invention is also directed to a system for replacing an underground pipe. The system comprises a rod string, a bursting assembly, and a downhole machine. The rod string comprises a downhole end and an uphole end. The rod string comprises a plurality of rods connected end-to-end, wherein each rod comprises a non-circular area disposed proximate to each end of each rod. The bursting assembly is supported at the downhole end of the rod string. The downhole machine comprises a frame, a spindle assembly supported on the frame and connected to the uphole end of the rod string, a vise assembly, and at least one hydraulic cylinder. The vise assembly is supported on the frame and includes two pairs of separately actuable jaws positioned to grip a rod nearest the spindle assembly and a rod adjacent the rod nearest the spindle assembly. The at least one hydraulic cylinder actuates axial movement of the vise assembly and the spindle assembly along the frame to thrust or pull the rod string and bursting assembly through the underground pipe. The vise assembly grips the rod nearest the spindle assembly at the non-circular area so the hydraulic cylinder can pull the rod string and bursting assembly through the underground pipe without rotation.

The invention also relates to an improved static bursting system. According to one aspect of the invention, the system provides for plain bearing pullback without rotation, while allowing rotation during payout. Rod string rotation must be a feature of this design available during rod payout. In many applications where an existing line has collapsed, the rod string or winch rope cannot be passed through the collapsed section successfully. A system that rotates the drill string makes it possible to guide the unit through the collapse as rod is added using either a non-directional drill bit or a drill head as typically used in horizontal directional drilling (HDD).

While working through this collapsed section, modest axial thrust in the range of 1000 to 40,000 lb may be applied to the bit through the drill string during rotation. This allows the bit to displace material with the option of delivering drill fluid through the hollow drill string to float the soil out of the existing pipe. The thrust must be applied to the drill string through a bearing. Roller bearings of this capacity are moderately but not excessively large and costly.

Pullback is the process wherein rod is removed from the drill string, shortening the string. The tooling is progressively pulled through the existing pipe, cracking the pipe and expanding the local soil. During the process, the rod string is not rotated. Forces applied to the drill string are in the range of 60,000 to 250,000 lb, significantly greater than during rod payout. Bearings of this capacity are very large and costly. To avoid the encumbrance of these bearings, according to the invention, a plain load bearing flange is used instead. This bearing will not support rotation during pullback and will in fact cause the rotation motor to stall should rotation be attempted when high axial pullback forces are applied. To achieve a successful design in this style, the shaft should be free to float a short distance between being loaded on the payout direction against the roller bearing and being thrust against the plain bearing load flange in the pullback direction. This float may be small in magnitude, e.g. between 0.05 and 0.25 inch.

It is advantageous but not necessary to preload the shaft against the roller bearing when no load is applied to the rod string. This preload can be modest, in the 500 to 2000 lb range. It is best achieved with a preloaded spring, the spring is depressed a short percentage of its design travel in the installed condition. This preload does not change as axial thrust in the payout direction is applied. As axial thrust in the pullback direction is applied, the modest spring force is overcome and the spring compresses further. This allows axial movement of the shaft relative to the bearings. As the shaft moves through the short distance per the design, it soon contacts the plain bearing load flange.

According to the invention, the drill string is allowed to rotate during payout to drill through obstructions within a collapsed pipe. During pullback, the unit is unable to rotate the rod string, therefore rendering tooling such as back reamers that function with rotation unusable. Pullback tooling is therefore limited to conical expanders, blades and other devices that perform hole and pipe expansion via axial movement only.

The invention further provides a "bungee vise" that aids in extending or retracting the drill string. During both the payout and pullback phases of a bursting job, the movement of the rod is stopped momentarily to add or remove the last rod of the string. During this moment, there are residual forces applying an elastic load to the rod string. During payout, that elastic load may be due to an arced path that the existing pipeline follows, or it might be due to an obstruction encountered at the front of the rod. Because the rod string is small in diameter compared to the existing host pipe, any load will cause an imperceptible buckling that will disappear should the load be released. The buckling uses up a small percentage of the length of the rod string, as little as nothing or as great as 12 inches. Unloading of the rod during the period when the rod is stopped would cause the rod to thrust back this distance, resulting in location issues for rod thread up and causing wasted travel every time the process is repeated.

During pullback, the process is similar but opposite. The elastic load applied to the tooling by the product pipe will produce residual load even when the rod string has been halted and work done by the tooling has halted. If the rod is not secured while the last rod is being removed, then the string will be pulled by the elastic pipe forces back into the bore. This distance can be anywhere from nothing to 3 feet depending on the soil conditions.

In order to overcome these potential problems with residual load, a vise of the invention is configured to grip the rod string and provide frictional force due to high hydraulically induced clamping forces. In addition to the frictional force, should the residual loads be exceptionally high, the gripping jaws are configured to encounter a shoulder on the rod after a brief amount of axial slippage. This slippage is best kept to a minimum, preferably in the range of 0.10 to 0.25 inch, in order to limit damage to the gripped surfaces on the rod and jaw. The vise is called on to do another task, that of restraining the rod string from rotating while the last rod is being rotated with significant torque to either add it to or remove it from the drill string. While the threading operation is in process, the vise holds the residual axial load of the string while simultaneously preventing the string from rotating as torque is applied to add or remove another rod.

A further aspect of the invention relates to the thrust cylinders. In a static bursting system, the rod thrust or pullback is normally applied to the rod string via actuation of hydraulic cylinders. Normally, hydraulic cylinders are designed in a manner where flexible hydraulic hoses are plumbed to the cylinder body through ports in the cylinder wall. Pressurized hydraulic fluid is fed to the cylinders through these ports and the cylinder rod is extended or retracted relative to the cylinder body as a function of which port the fluid is supplied to.

In the commonplace configuration just described, most mobile hydraulic equipment is assembled with the cylinder body fixed or pinned to the frame of the machine. Further, the rod, not the cylinder body, is permitted to extend or retract relative to that same frame. This works well in most cases as the flexible hoses do not have to move any appreciable distance during movement of the rod. Should the rod end be pinned to the frame and the cylinder end with hoses attached be allowed to move, this would not be the case.

Moving hoses are prone to abrasive wear, leaking and pinching in machine features. Also, the slack in the hoses that must be accommodated in the retracted condition would make them prone to being snagged on other machine components and possibly torn out of the ports at either end. In the case of the machine used as an example herein, the travel of the cylinders is 46.5" from fully retracted to fully extended. In this case, successfully accommodating moving hoses over that length would prove difficult.

Conventional cylinders as described above with a rod extending through one end of the cylinder have forces that are not equal in the extension and retraction directions. The area of the cylinder bore is always greater than the area of the cylinder bore less the cross sectional area of the rod. This is well understood in hydraulic cylinder application and allows the design of the cylinder to be tailored with variation in rod size should the retraction direction not be the primary work direction. A larger rod diameter causes the rod side of the cylinder to have a small area and therefore permits rapid retraction for a given hydraulic pump flow rate. A bursting machine using the concepts disclosed herein uses the more powerful extension direction to pull rod back, and the less powerful direction to thrust rod in the payout direction. The cylinders each have a rod that is large in comparison to the cylinder size, thus there is no compromise on performance of the machine due to either using cylinders in the 'wrong' direction, or using cylinders available through an industrial catalog that would have a small rod diameter.

Conventional static bursting machines are configured with the cylinder body stationary and the rod attached to the moving carriage. This carriage serves to grip or propel the rod string in the direction chosen by the operator. According to the invention, the cylinders are configured with the cylinder body attached to the carriage and the rod anchored at the front of the machine where they are loaded against the shoring plate. While the rod size in these cylinders is large in comparison to the cylinder body, it is still smaller than the cylinder body. By reversing the normal orientation, the tooling at the end of the rod string may be pulled into the machine and 'docked' between the cylinder rods. This would still be possible in the conventional orientation that has been described, however it should be understood that the machine would require greater overall width. This increased width has the potential to encumber operation and will require additional weight, added pit excavation, and greater difficulty in machine placement should there be other utilities located adjacent to the host pipe being burst.

The combination of the relatively large rod diameter coupled with the desire not to feed the hydraulic cylinders through flexible hoses that move with the bodies creates an opportunity to feed the cylinders through drilled longitudinal passages in the rod. The hydraulic hoses are attached to the rod at the rod end which is anchored to the frame or shore plate. These dual passages are drilled the length of the rod to provide both ingress and egress of the hydraulic fluid to the cylinder cavities. These passages eliminate any need for the hoses to move with the carriage.

Another option according to this aspect the invention that is used in the example below works with the reverse cylinder configuration to narrow the machine further. Offsetting the cylinders such that the cylinders are positioned diagonally relative to the frame of the machine, above and below the spindle shaft will orient the rods so that docked tooling may be removed from between the rods while still allowing the operator to stand close to the center line of the machine. This position close to the center line becomes important when the operator is loading or removing rods manually into/from the docking area along the centerline.

The invention further provides a collapsing rod cradle made to support and align a rod when it is added to or removed from the rod string. The design of this support or cradle becomes complicated when applied to a bursting machine such as that described previously and further having a spindle that applies the pulling or thrusting force via direct threaded attachment to the rod string. The rods are added or removed in a zone that is between the vise and the spindle frame face. Further, during this operation it is necessary for the front end of the rod to reside in the vise, the back half of the rod must sit in a cradle that is in the vicinity of the spindle face. During the cycle of traversing the spindle from right to left, the zone where the rod was added is now 'compressed' until the spindle frame nearly touches the vise.

While this right to left spindle frame movement is intended to move the rod string, it also results in the spindle frame occupying the volume where the rod cradle was performing its function of supporting the rod. Once the rod is tied into the rod string by making up the thread between the last and next to last rods, as well as between the last rod and the spindle, the cradle is no longer needed. It would be possible to use a cradle mechanism, that collapses into the area below the spindle frame as the frame moves from right to left, and reset into position as the frame moved left to right. Such a design has been used in the past on machines such as the Vermeer PL8000 directional boring machine. In this case, spoil or contamination bound to enter into the machine and fall into the hull would impair the free movement of the device.

For the aforementioned reason, the cradle of the invention is preferably designed in not only a telescoping manner, but is also engineered to follow a path during retraction that would cause it to move away from the rod as it is retracted. This distance gained between the cradle and the rod helps prevent the rod upset from hanging up on the cradle as the relative axial movement occurs. Any entanglement between the cradle and rod could result in a damaged cradle mechanism.

In contrast to the known static pulling machines mentioned above, the machine of the invention uses a front shore plate with a slotted opening to provide good shoring area and limit soil entry into the machine. The shore plate is removed prior to entry of the tooling into the machine through a relatively large (15.5" diameter) front hole. This is a unique feature when the floating vise is combined with a removable shore plate. These and other aspects of the invention are further described in the detailed description which follows.

BRIEF DESCRIPTION OF THE DRAWINGS

In the accompanying drawings, where like numerals denote like elements:

FIG. 15 is a top view of a thrust cylinder of FIG. 1, in an extended position;

FIG. 16 is a side view of the thrust cylinder of FIG. 15;

FIG. 19 is an enlarged sectional view of the seal carrier shown in FIG. 17;

FIG. 20 is an enlarged sectional view of rod seal shown in FIG. 17;

FIG. 21 is enlarged side view of the piston and seals of FIG. 18;

DETAILED DESCRIPTION

Figure 1:
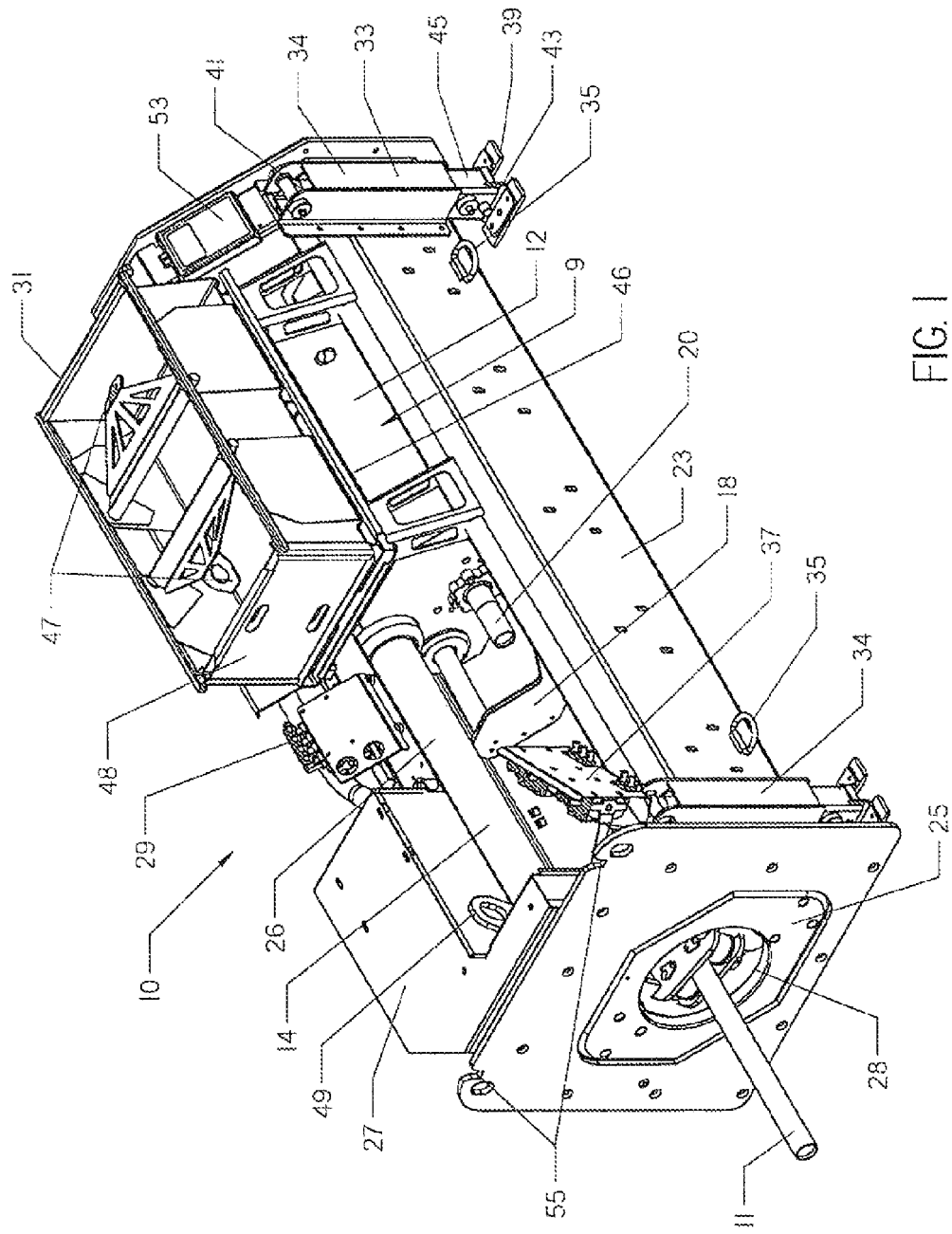
FIG. 1 is a perspective view of a rod pushing and pulling machine according to the invention.

FIG. 1 shows a downhole machine 10 of a pipe bursting machine of the invention. A spindle assembly 9 including a spindle frame 12 is shown with its sheet metal cover in place. Spindle frame 12 traverses right-to-left a distance equal to 40% of the overall length of the entire machine. The spindle shaft 115 of spindle assembly 9 is connected to a rod string 11 by a threaded joint in the end of a spindle shaft extension 20 which is made as a separate part for ease of replaceability.

Force to perform the pipe bursting operation is applied to spindle frame 12 via a pair of hydraulic cylinders 26. A cylinder rod 14 of each cylinder 26 is attached to a front shore plate 25. Shore plate 25 is placed against the access pit wall and the face of the existing or host pipe. A rod box 31 stores rods to add to or remove from rod string 11. When rod box 31 is full, tabs 47 are rotated upwards and a lifting hook is engaged. Box 31 is then replaced with a box full of rods or an empty box, as the situation demands. Box 31 sits on a tray 46. Tray 46 holds box 31 in position to facilitate easy manual rod placement into or away from a rod cradle 18. A front access door 48 is removed to extract or replace rods. Tray 46 is removable for transport. When tray 46 is removed, the mate to eye 49 is exposed. This pair of eyes 49 facilitates lifting the entire lower unit 10 into or out of the access pit.

Tie down loops 35 are used in transport to secure the lower unit 10 to a truck bed or trailer. A storage box 53 holds the operator's manual. A cover 27 protects a large pilot-controlled hydraulic valve (not shown). This valve facilitates the high hydraulic flows required to actuate the main thrust cylinders 26. The pilot flows that control the valve are metered at a control station 37 by the machine operator. Direction and flow rate of the main thrust cylinders 26, as well as spindle motor direction, are controlled at station 37.

Four height adjustment legs 34 are provided at the four corners of the machine 10. A hydraulic cylinder 41 of each leg 34 is secured to an outer frame 33 of leg 34. Frame 33 is bolted to main hull 23 which contains the majority of the working components of the lower unit 10. Extension of cylinder 41 moves inner leg 45 down, forcing foot 39 against the pit bottom. Foot 39 is free to pivot about a pin 43. Similar height adjustment legs 34 are located at all four corners of the machine 10. The cylinders 41 are actuated by the operator at hydraulic control station 29.

Figure 2:
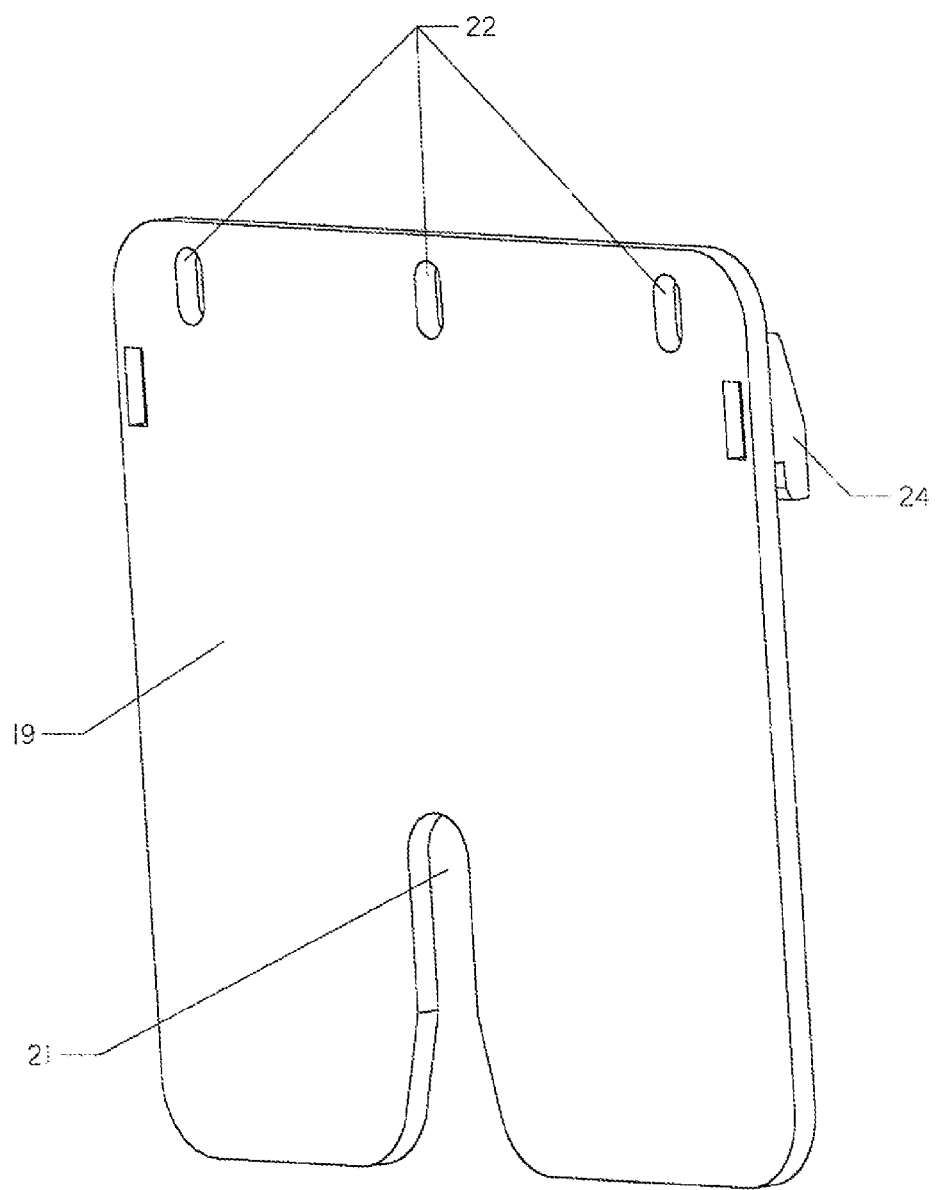
FIG. 2 is a perspective view of an auxiliary shore plate used with the machine of FIG. 1.

At the front of the unit, shore plate 25 has notches 55 on its upper edge for mounting an auxiliary shore plate 19 thereon (FIG. 2). Auxiliary shore plate 19 doubles up over shore plate 25 with its main face forward. A downwardly opening slot 21 allows the rod string to pass through plate 19 as well as allowing the auxiliary shore plate 19 to be lifted off rod string 11 when nearing completion of the bursting job. This removal becomes necessary so that the tooling may be drawn through the large center hole 28 in shore plate 25 surrounding the rod string 11. Tabs 24, located on both sides of plate 19, fit into notches 55 to assure alignment and proper height of slot 21. A series of slots 22 near the upper edge of plate 19 allow it to be lowered into or raised out of the pit.

Figure 3:
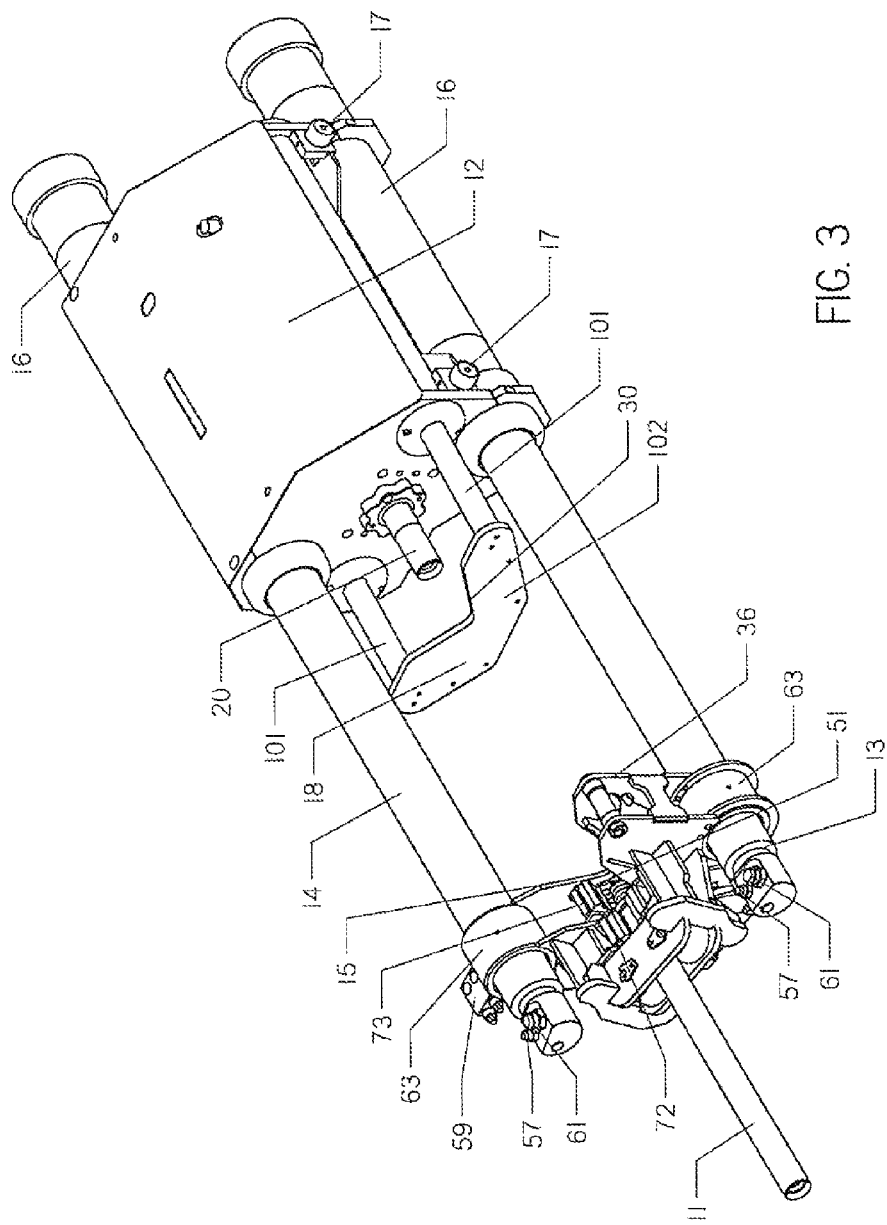
FIG. 3 is a perspective view of the spindle assembly, jaw assembly and cylinders of the machine of FIG. 1, with the cylinders extended and the jaw assembly in its front position.

FIG. 3 is an isometric view from the same vantage as FIG. 1; however it differs in that all external components of machine 10 have been removed. Spindle frame 12 is supported vertically by track rollers 17. Two track rollers 17 are visible; they in fact exist at all four corners of the frame 12. Track rollers 17 may be those available from Torrington Manufacturing, effectively small steel wheels with an internal needle roller bearing. In this view, cylinder body 16 is visible throughout its length. Rod cradle 18 is shown fully extended with a crotch 30 aligned with shaft extension 20. Cylinder rod 14 is also fully extended, making the area for rod placement and removal of rods between shaft extension 20 and rod string 11 easy to see.

A vise assembly 15 is shown with rod string 11 clamped in one of two jaw sets 72, 73. Serrations 51 on jaws 72, 73 can clamp on an added rod to apply torque. Vise 15 is further guided and restrained by cylinder rods 14 which pass through cylindrical sleeves 63 forming ends of the frame 36 supporting vise 15 for movement, along cylinder rods 14. Shoulders 13 at the front ends of cylinder rods 14 are mounted to and react in thrust against shore plate 25. Hydraulic ports 57 and 61 on each rod 14 are used to connect flexible hydraulic supply hoses to feed the thrust cylinders 26 made up of rod 14 and cylinder body 16. Hydraulic control valve 59 sequences the operation of the jaws in vise 15.

Figure 4:
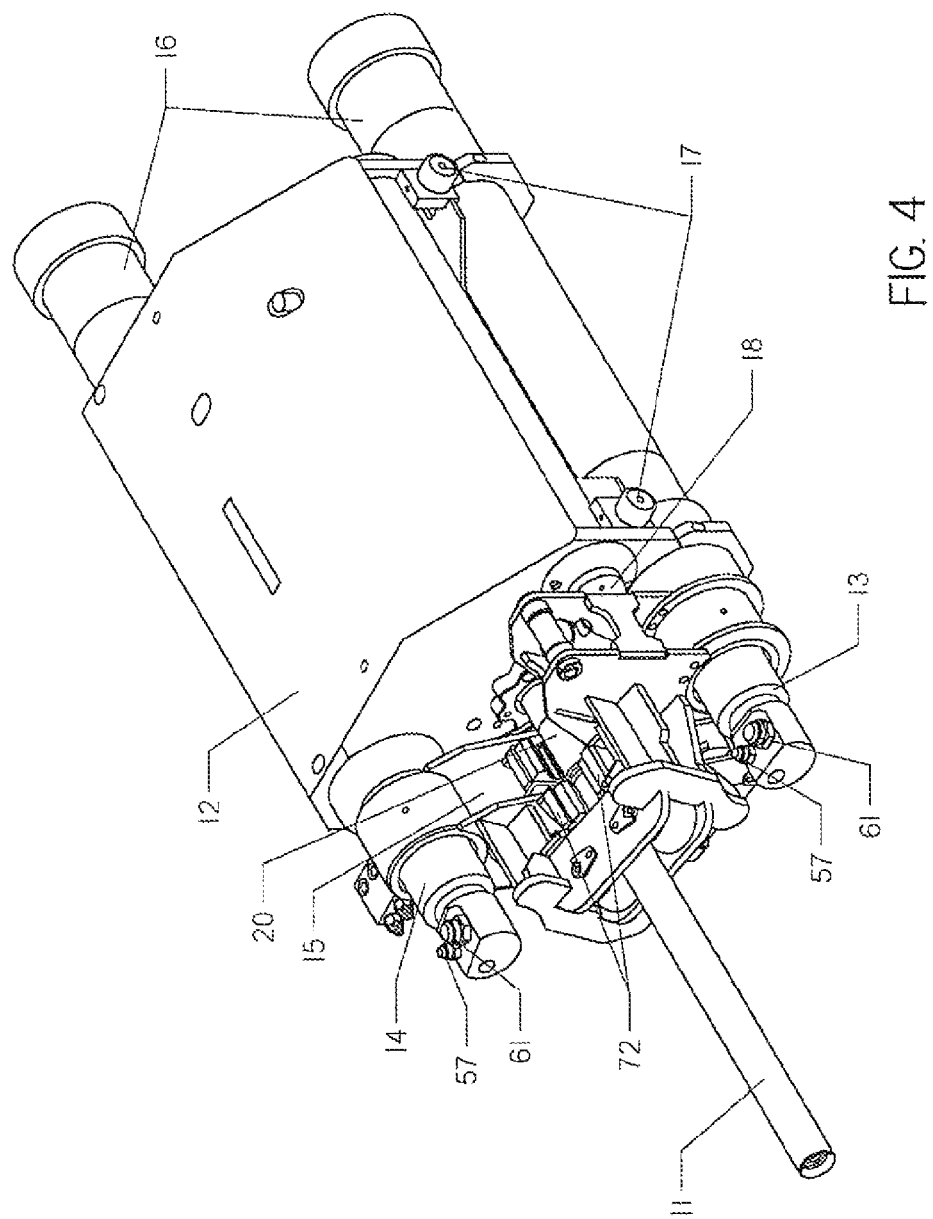
FIG. 4 is the same view as FIG. 3, with the cylinders retracted.

FIG. 4 is the same set of components as FIG. 3; however rods 14 have been fully retracted into cylinder bodies 16. With shoulders 13 attached to shore plate 25 (such as by bolts) and the shore plate 25 further bolted to hull 23, the result of retracting rod 14 is actually to move cylinder bodies 16 and attached spindle frame 12 closer to shore plate 25. In this position, vise 15 is very close to spindle frame 12, leaving no room for rod cradle 18. Rod cradle 18, partially visible behind vise 15, has retracted into spindle frame 12 with its supporting arms 101 inside spindle frame 12 and crosspiece 102 against the spindle frame 12. Rod string 11 is now in position to be threaded to spindle extension 20. This is accomplished by clamping the forward set of jaws 72 in vise 15 against rod string 11 (operation shown completed) and rotating the spindle extension 20 in the appropriate direction.

Figure 5:
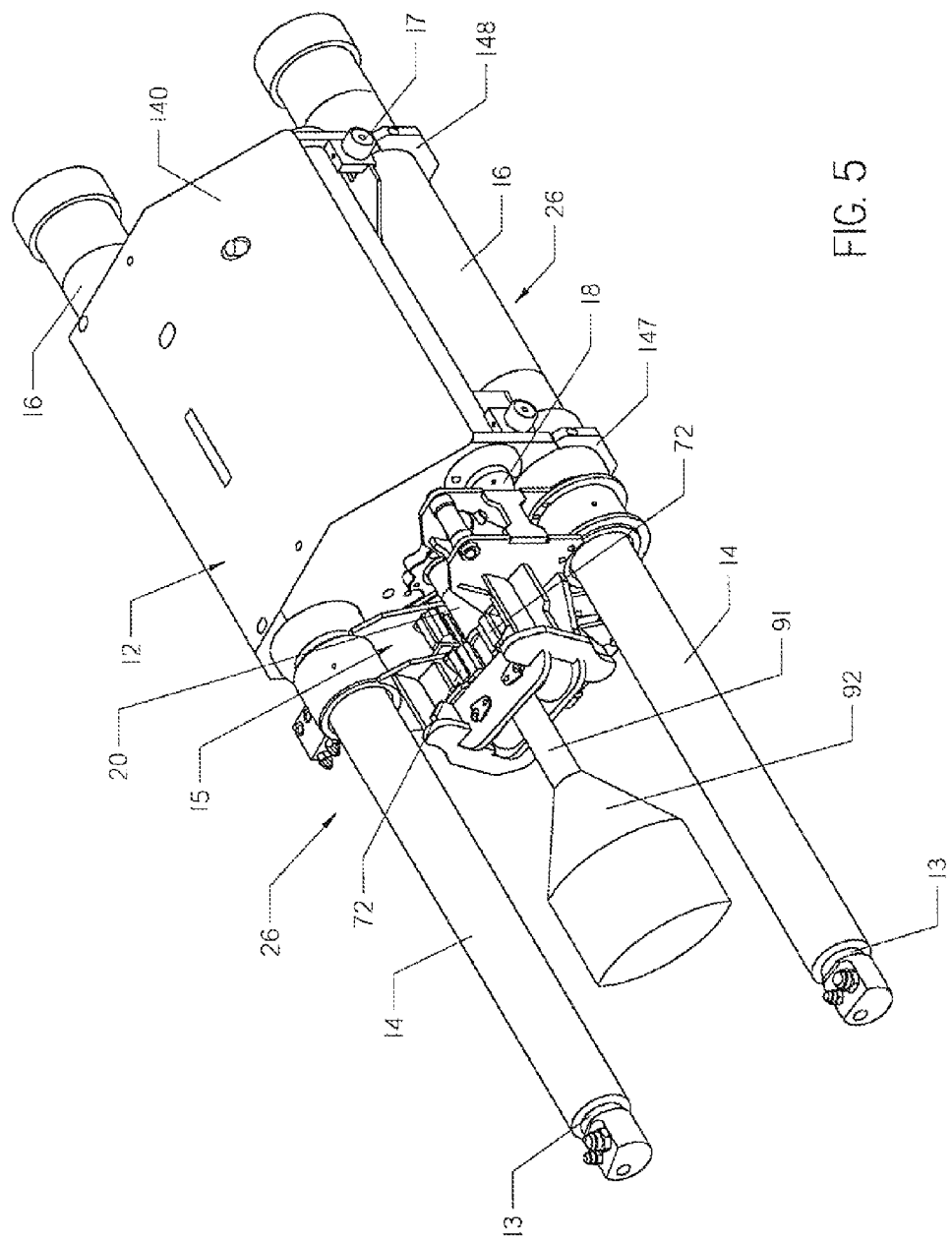
FIG. 5 is the same view as FIG. 3, with the cylinders extended and the jaw assembly in its rear position (the "final docking" position)
Figure 6:
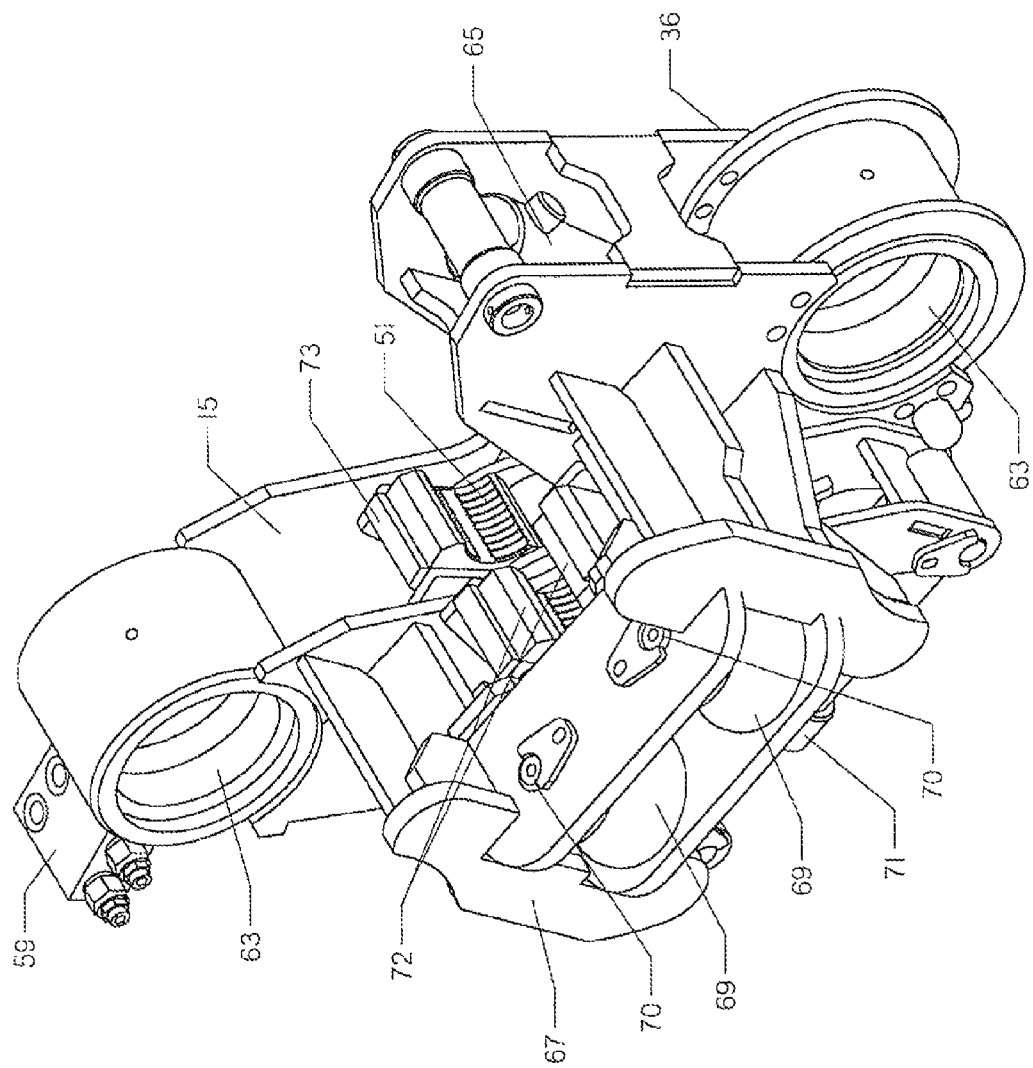
FIG. 6 is a perspective view of the jaw assembly of the preceding figures.

Referring to FIG. 5, rod 14 is then fully extended from cylinder body 16. Vise 15 is pulled along with spindle frame 12 from its normal working position. This is accomplished by engaging jaw set 72 against rod string 11 and extending rod 14 to move the entire assembly of frame 12 and vise 15 to the right. This position is desirable when tooling must be pulled into hull 23 for final docking as explained hereafter. Vise 15 is more completely visible in FIG. 6. Sleeves 63 are hollow, permitting them to be centered on rods 14. This provides torque reaction when the rod string is tightened, as well as permitting sliding along rods 14 when room must be made for docking of the tooling as per FIG. 5.

Front faces 67 of vise frame 36 are configured to rest against the back of shore plate 25. In doing so, they react against residual elastic pipe forces that may be present. Idler rollers 69 set on spaced vertical axles 70 keep rod string 11 centered relative to the vise and therefore to the rest of the machine. Rollers 69 are engineered so that shoulders on the rod will pass freely through them. A pair of cylinders 71 actuate clamping of jaws 72 and 73. Another cylinder 65, while the same size as cylinder 71, is positioned to rotate jaws 73 about the axis of rod string 11. This is done when jaws 73 are clamped and serrated surfaces 51 of jaws 73 grip the rod securely. Cylinder 65 breaks loose the threaded joint between rod string 11 and the endmost rod, allowing the endmost rod to be removed from the string. To loosen the threaded joint between rod string 11 and the endmost joint, jaws 73 turn approximately 30°, in any case less than 360°. This feature is only used to loosen threaded rod joints, never to tighten, because jaws 73 create very high torque relative to the spindle rotation drive motor.

Figure 7:
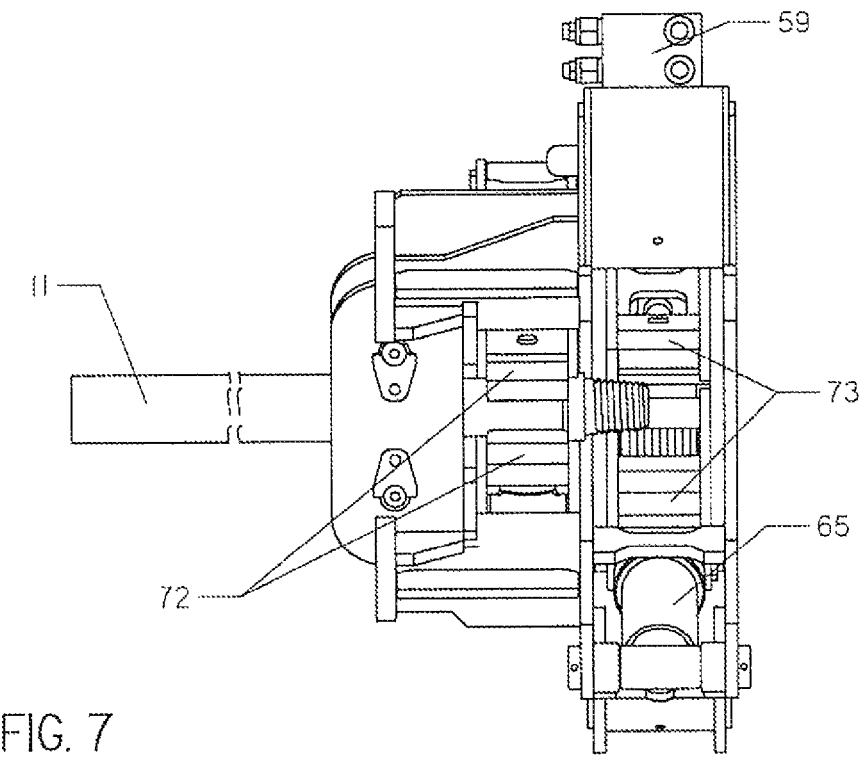
FIG. 7 is a top view of the jaw assembly of FIG. 6.
Figure 8:
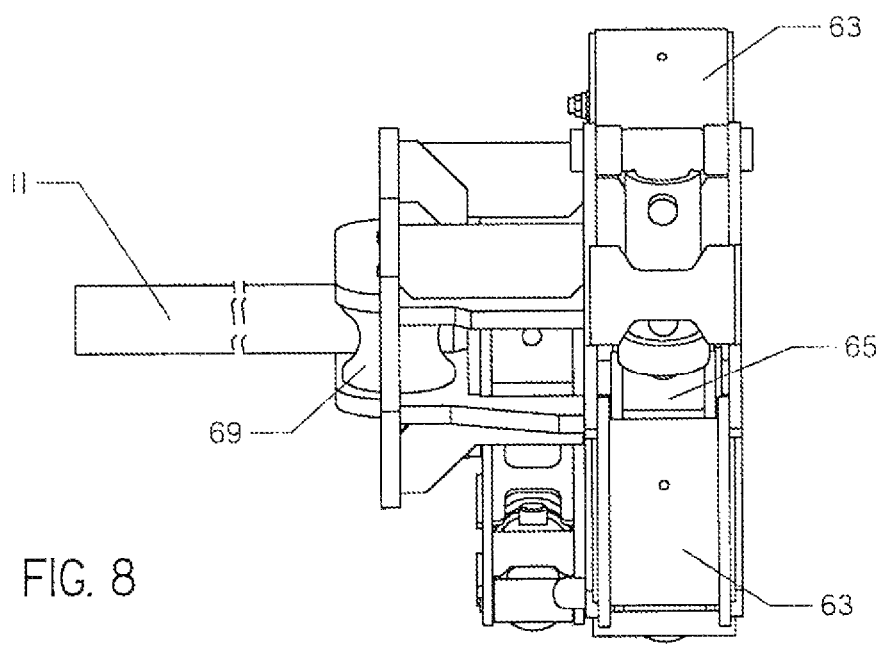
FIG. 8 is a side view of the jaw assembly of FIG. 6.
Figure 9:
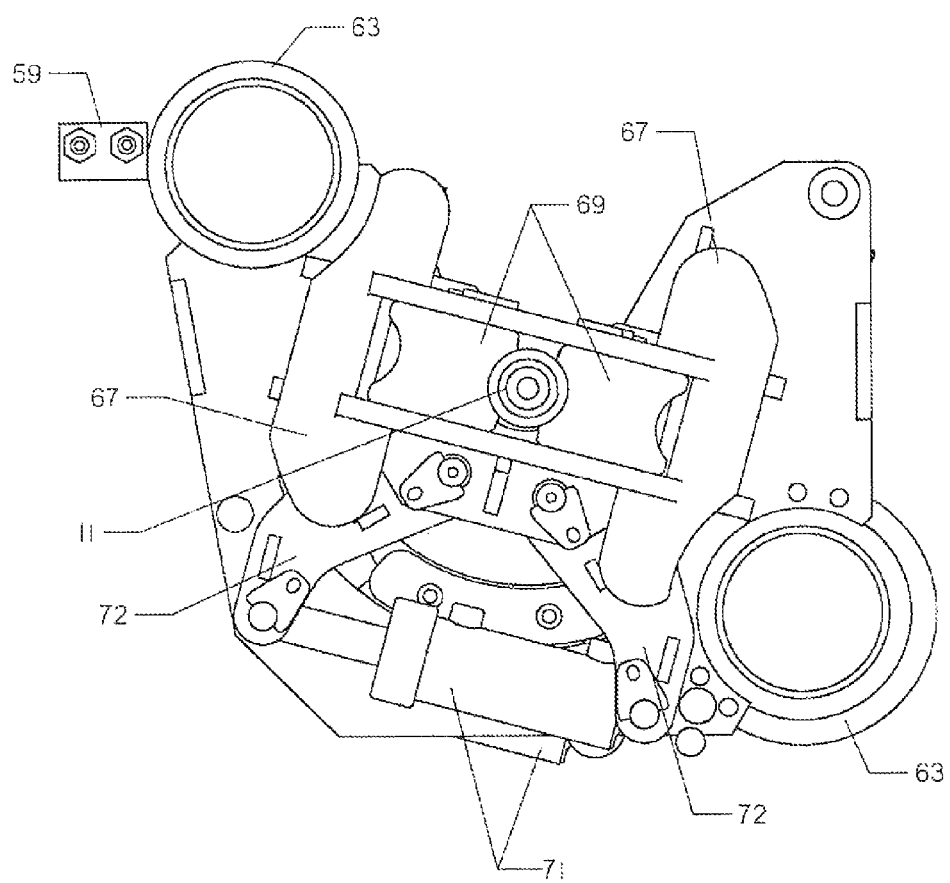
FIG. 9 is a front view of the jaw assembly of FIG. 6.

FIG. 7 shows all of the jaws 72 and 73 from above. In this figure, jaws 72 are clamped on the available rod, while jaws 73 are open. In FIG. 8, a greater portion of cylinder 65 is exposed. In FIG. 9, idler rollers 69 are fully visible in profile, shown guiding and centering rod string 11. This view demonstrates how cylinder 71 is positioned to provide clamp load on rod string 11.

Figure 10:
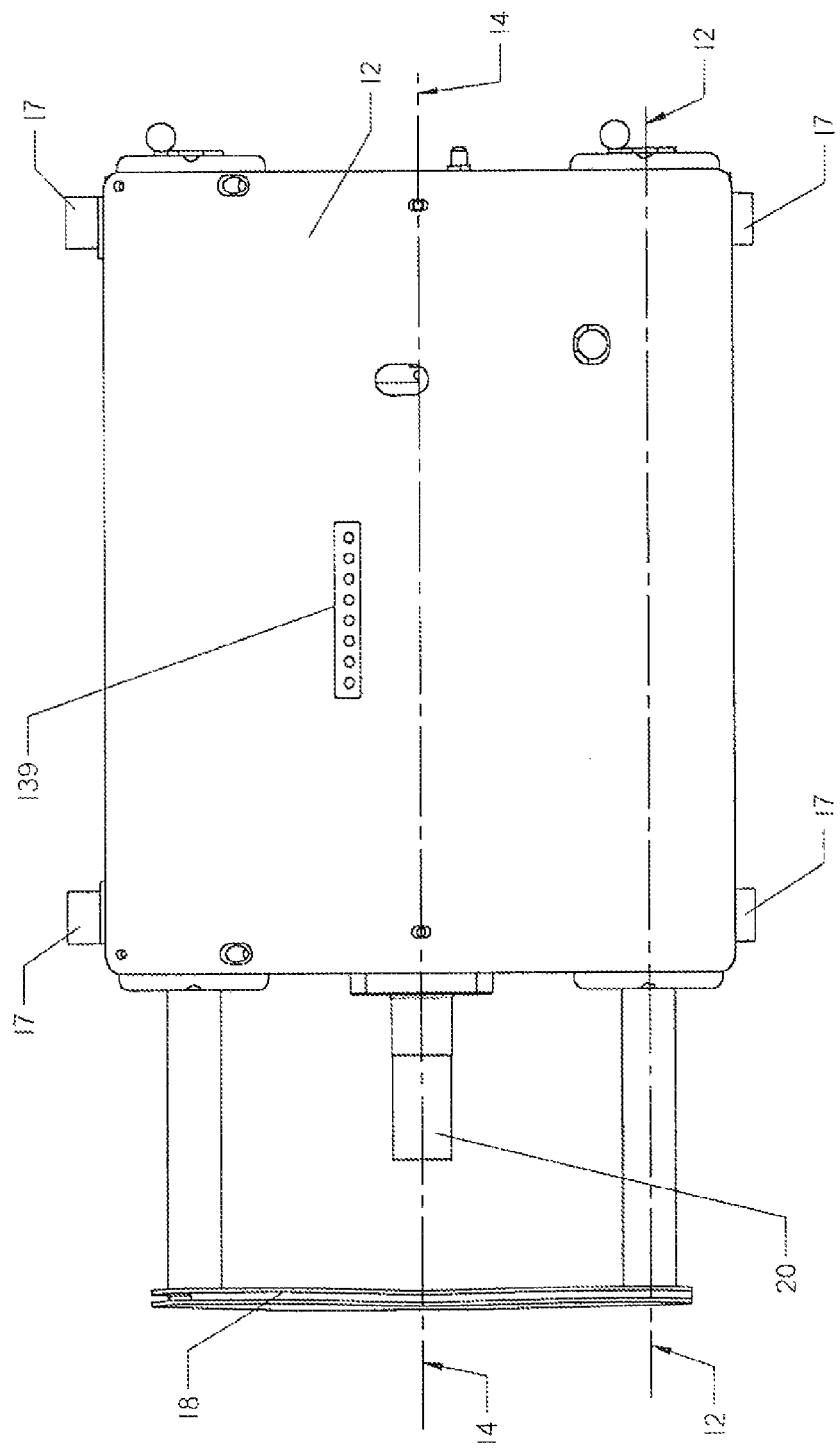
FIG. 10 is a top view of the spindle assembly of the preceding figures with cradle extended.
Figure 11:
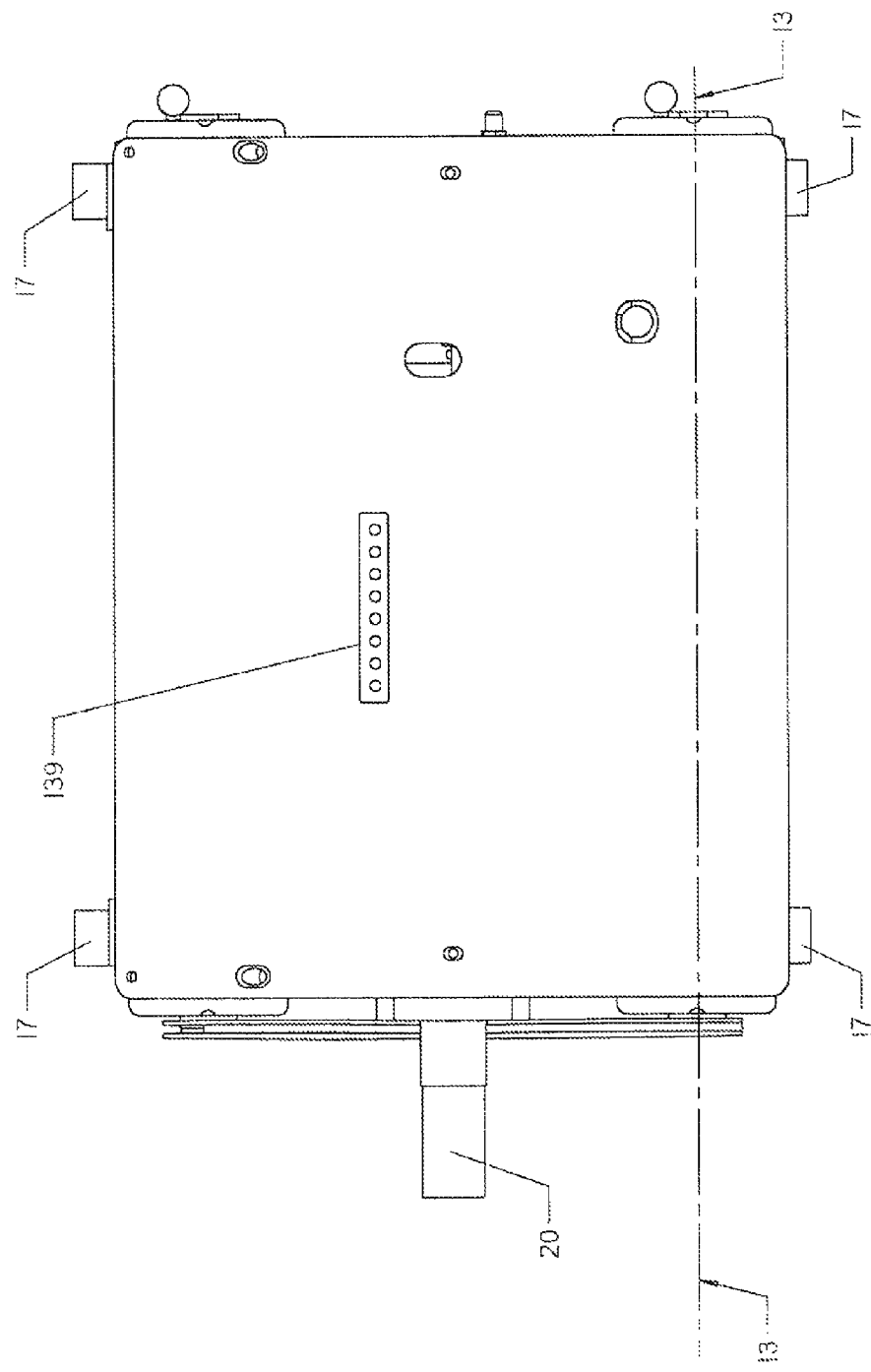
FIG. 11 is a top view of the spindle assembly of the preceding figures with cradle retracted.
Figure 14:
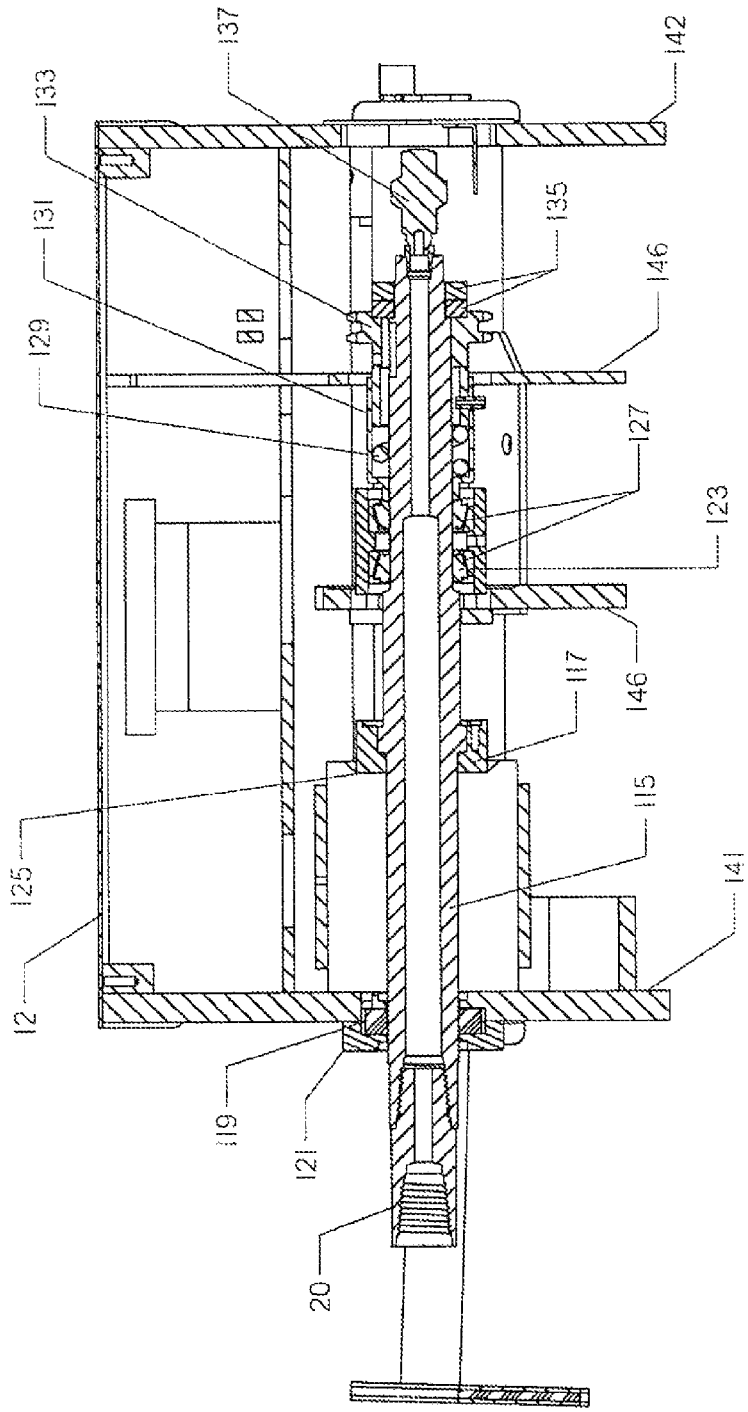
FIG. 14 is a sectional view taken along the line 14-14 in FIG. 10.
Figure 17:
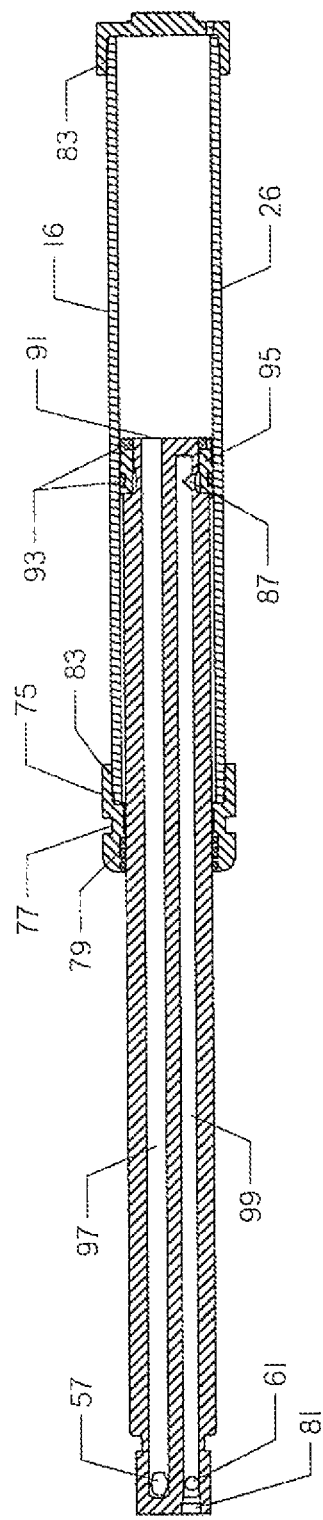
FIG. 17 is a sectional view taken along the line 17-17 in FIG. 16.
Figure 18:
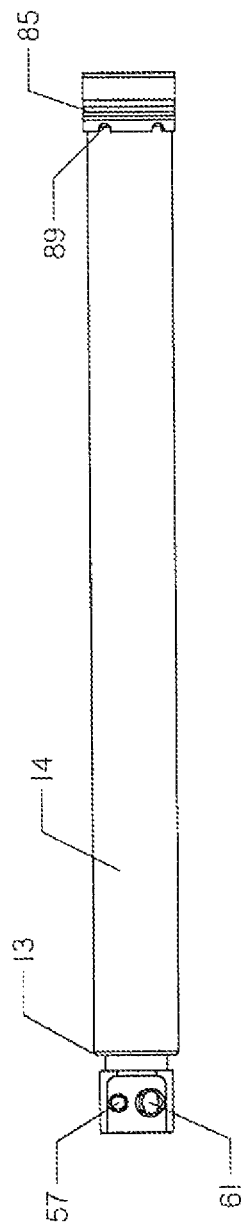
FIG. 18 a top view of the rod shown in FIGS. 15-17.
Figure 22:
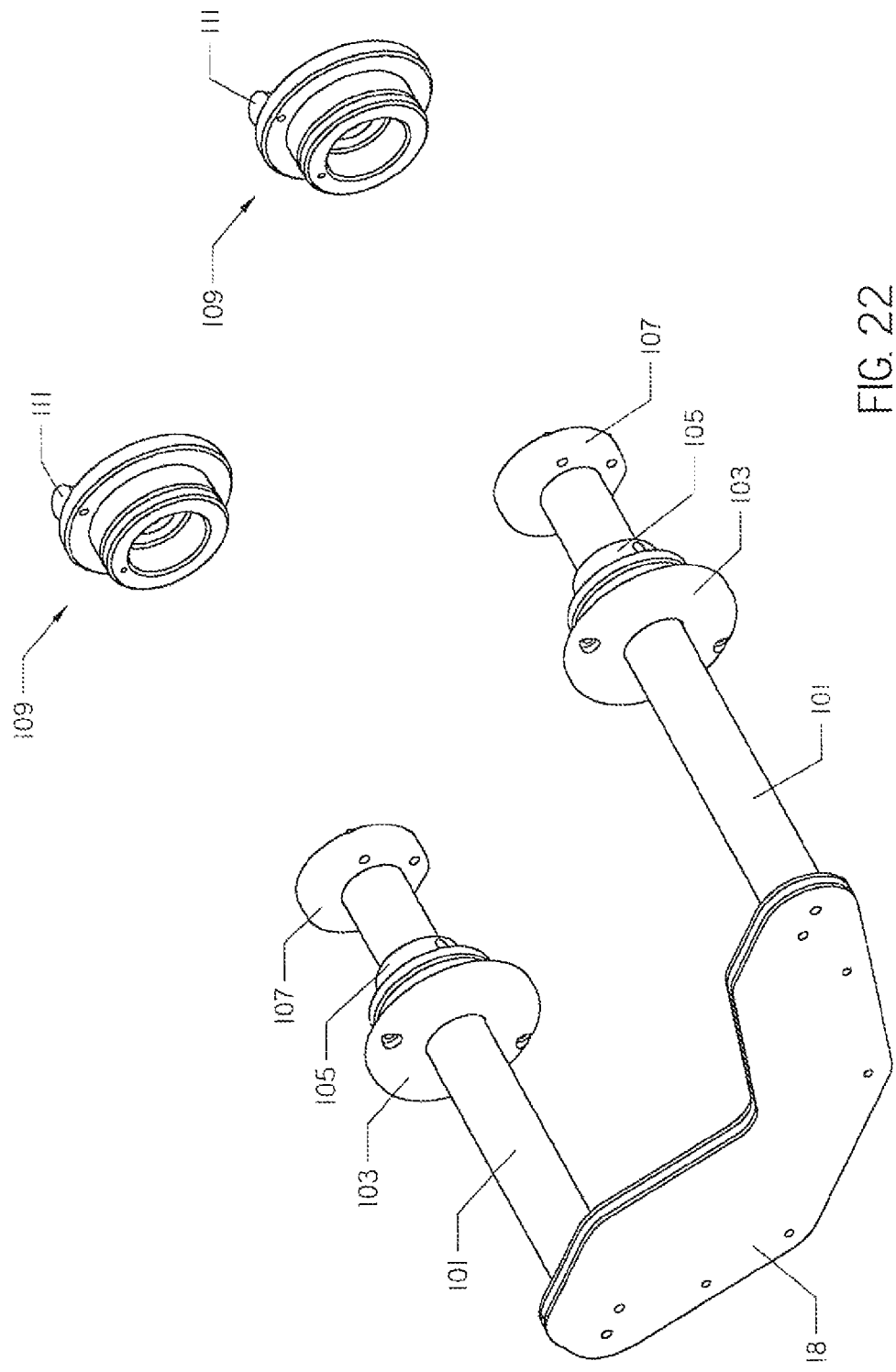
FIG. 22 is an exploded view of the cradle assembly of the machine of FIG. 1.

In FIG. 10, rod cradle 18 is shown fully extended. The four track rollers 17 are mounted at respective corners of rectangular spindle frame 12, and a grease zerk manifold 139 is exposed through an opening in the top of frame 12. Frame 12 includes a pair of front and rear walls 141, 142 having pairs of aligned openings 143, 144 therein in which cylinder bodies 16 are mounted, as well as internal structural members 146 on which various spindle assembly components are mounted as shown in FIG. 14. Openings 143, 144 preferably open laterally so that cylinders 26 can be removably mounted therein. Pairs of generally C-shaped holders 147, 148 are placed over the outside of cylinder body 16 and bolted to frame 12 to hold cylinders 26 in place. To hold cylinder bodies 16 stationary relative to frame 12, openings 143 and front holder 147 engage an annular groove 77 on the outside of cylinder body 16, discussed further in connection with FIGS. 15-17 below.

Figure 12:
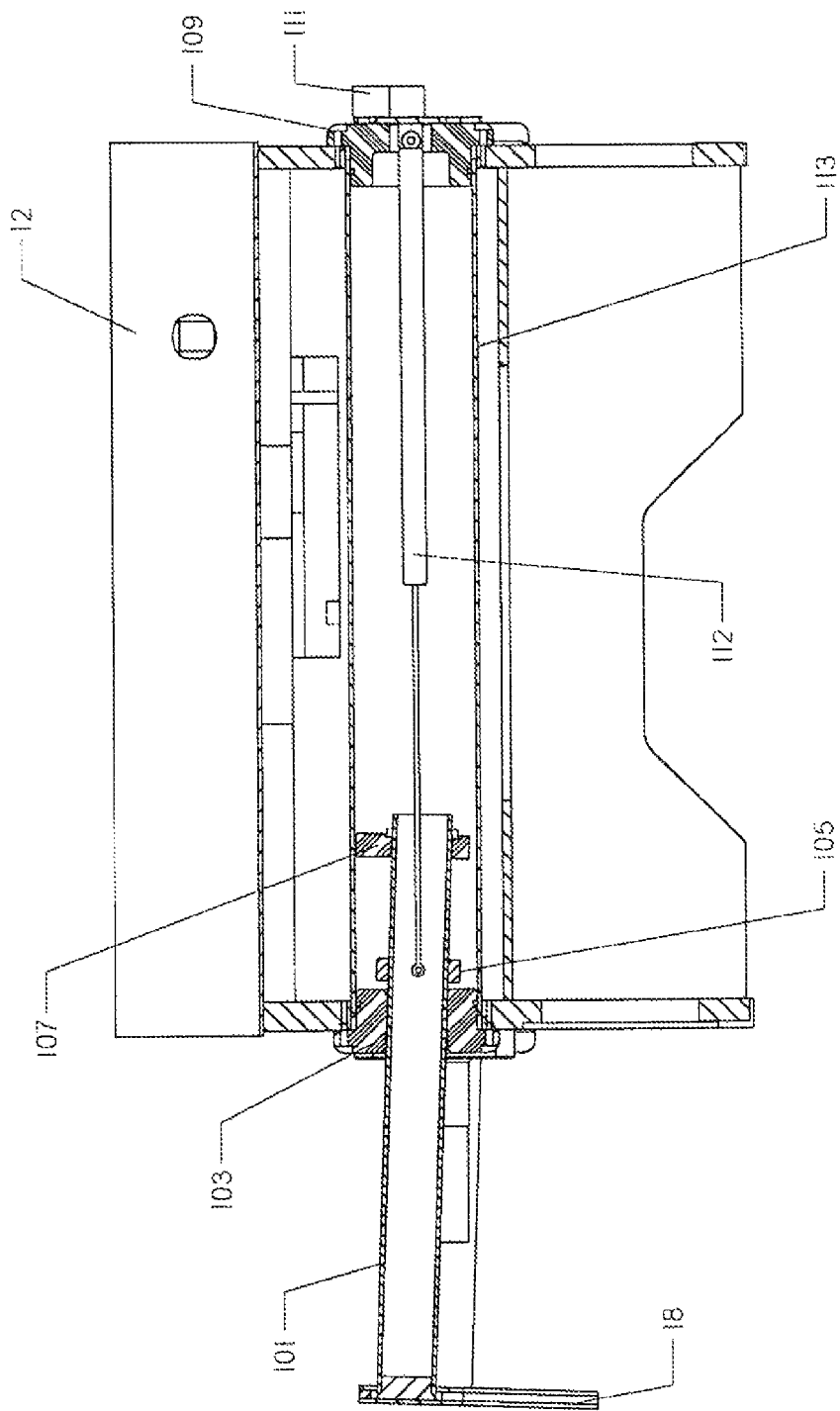
FIG. 12 is a side view, in section, taken along the line 12-12 in FIG. 10.

As shown in FIG. 12, an arm 101 is configured to slide freely through a concentrically positioned center hole in bushing 103. A collar 105 fixed to the outside of arm 101 limits outward travel of cradle 18 by bumping against the inner face of bushing 103. A piston 107 provides the reaction force needed to hold cradle 18 in the proper position. Piston 107 is secured near the rear end of arm 101 behind collar 105 and slides freely within a tube 113. Piston 107 is not located concentrically on arm 101. In this manner, the angle between the axis of arm 101 and the axis of tube 113 will vary as cradle 18 is moved away back and forth through its range of travel, urged to extend by a gas spring 112 which is attached at one end to the inside of tubular arm 101 at the position of collar 105. Cap 109 seals tube 113 at its rear end, and optional oiler 111 provides drip lubrication to the interior of tube 113.

Figure 13:
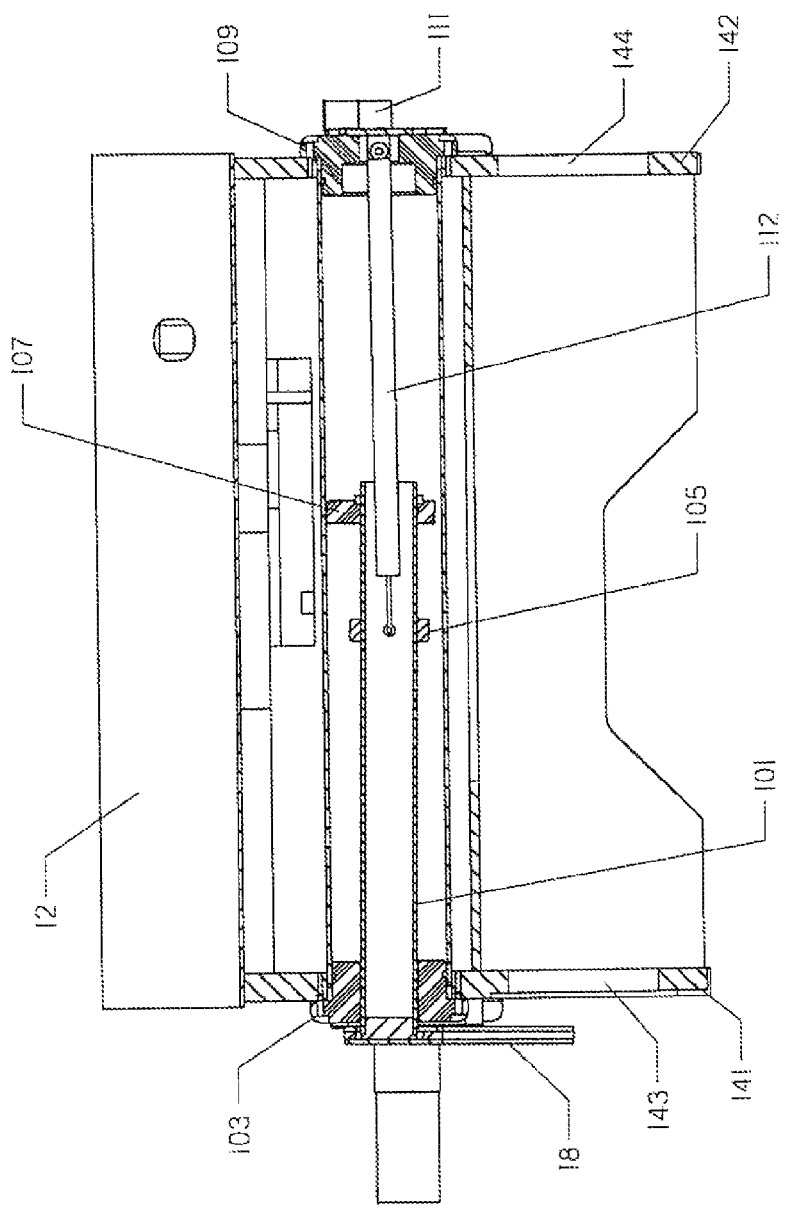
FIG. 13 is the same view as FIG. 12, showing the cradle in its retracted position (line 13-13 in FIG. 11)

The change in angle causes cradle 18 to fall away from the bottom of the rod as arms 101 of cradle 18 are retracted into their respective tubes 113. As shown in FIGS. 12 and 13, piston 107 biases the rear end of arm 101 downwardly relative to the opening through bushing 103, causing the front end to which cradle 18 is attached to be lifted upwardly. This displacement lessens as the distance between piston 107 and bushing 103 becomes greater, causing cradle 18 to drop downwardly a slight distance as piston reaches the position shown in FIG. 13. In this position, the angle between the axis of arm 101 and axis of tube 103 is smaller than as shown in FIG. 12.

Referring to FIG. 14, a front end portion of the spindle shaft 115 is mounted in a front plain bearing 119. Bearing 119 is contained in a bearing housing 121 that is bolted to the front face of spindle frame 12. Bearing 119 is designed only for handling radial forces transmitted from shaft 115. A rear end portion of spindle shaft 115 is supported by a set of tapered roller bearings 127 located in a housing 123 that is also bolted to spindle frame 12. Tapered roller bearings 127 support shaft 115 in both thrust and pullback directions. However, bearings 127 are sized only to handle the magnitude of thrust developed by the machine in payout, in this example about 40,000 lb. During pullback, the capacity of bearings 127 would be greatly exceeded by the 250,000 lb. of pullback force that can be produced by the main thrust cylinders 26. For this reason, the system has been designed to allow the shaft 115 to float, unloading the tapered roller bearings 127 in the pullback direction.

Figure 25:
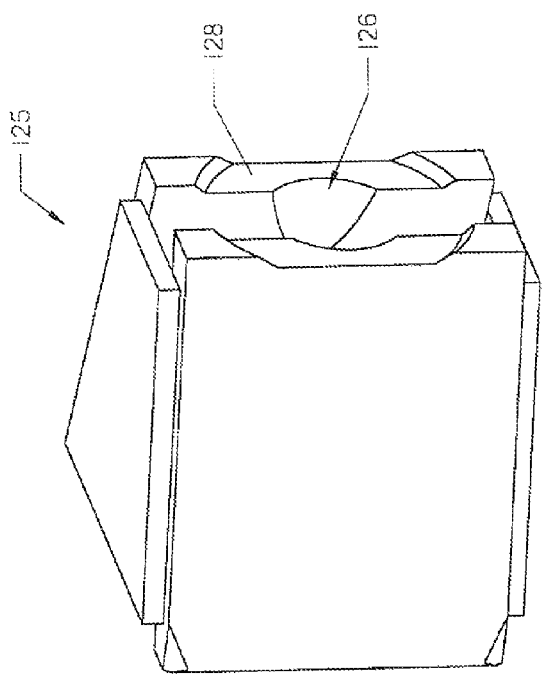
FIGS. 25 and 26 are side and end views, respectively of the load flange of FIG. 14.
Figure 26:
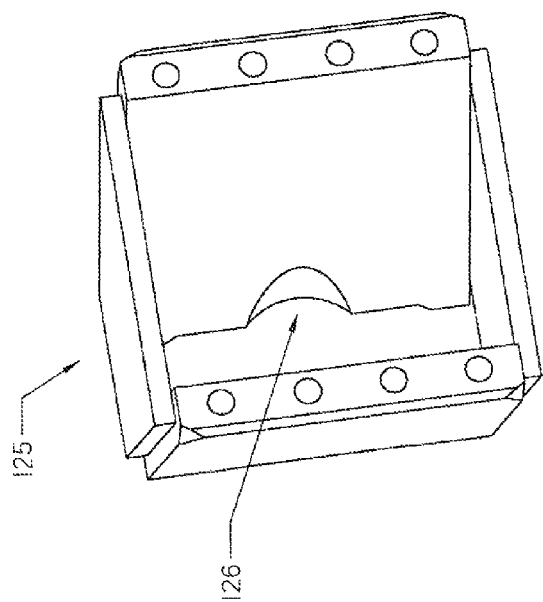

Spring can 131 is loaded against taper roller bearings 127 by a coil spring 129 for small magnitudes of pullback, such as breaking or unthreading the rod joint. When the load increases above a threshold level such as 1000 lb, the spring 131 has compressed far enough that a flange 117 mounted on shaft 115 at an intermediate position along its length contacts the face of a load flange 125. As shown in FIGS. 25 and 26, load flange 125 is preferably in the form of a wedge with its wide end bolted to and braced against frame 12. The narrow end of load flange 125 has a cylindrical cutaway 126 to provide clearance for the spindle shaft 115, and a counterbore the bottom of which forms a load bearing surface 128. When flange 117 is in substantial contact with surface 128 of flange 125, shaft 115 will not rotate due to the high friction induced. This is desired in that the machine is intended for static pipe bursting or other non-rotating pullback operations. Use of the plain bearing 119 and load flange 125 with flange 117 avoids the size and expense of a tapered roller bearing capable of handling 250,000 lb.

A sprocket 133 is torsionally keyed to shaft 115. A roller chain (not shown) drives sprocket 133 under the operator's control to thread or unthread rods or turn small diameter tooling during payout. A water swivel 137 allows drilling fluids to pass to the hollow drill stem while being fed by a non-rotating hose. Locknuts 135 are used to secure sprocket 133 to shaft 115 in the axial direction.

FIGS. 15-21 show the structure of cylinders 26 in detail. Hydraulic port 57 at the distal end of rod 14 communicates with a flow passage 97 inside rod 14 which opens onto the piston side of rod 14. Connecting the hydraulic fluid pressure source to port 57 while connecting port 61 to tank fills cylinder body 16 with fluid and extends rod 14. Port 61 communicates with another lengthwise flow passage 99 which extends almost to the rear end of rod 14. Passage 99 communicates with an outwardly opening annular groove 94 through a radial port 87. Fluid in groove 94 enters the space on the rod side of a piston 90 mounted at the rear end of rod 14 through a series of cutaways 89 in piston 90, retracting rod 14 when port 57 is connected to tank.

Piston 90 is mounted on the end of rod 14 by a steel lock ring 95. A split nylon wear ring 93 mounted in an annular groove on the outside of piston 90 slides along the inside of cylinder 16. Leakage between piston side and rod side is prevented by a urethane umbrella-type seal 96 mounted in another groove frontwardly from wear ring 93. A seal carrier or cap 75 is secured by threads 83 to the front end of cylinder body 16. Cap is supported on rod 14 by a nylon split bearing ring 81 and leakage is prevented by a series of nylon seals 82. As discussed above, rod 14 has a large diameter relative to cylinder body 16, making the annular space 88 on the rod side thin, so that only a small flow of fluid is required retract the cylinder in FIGS. 15-17. For this purpose, the cross section area of annular space 88 is from about 10% to 60% of the cross sectional area of the cylinder cavity. (This equates to a ratio of working surface area of from 10:1 to 1.67:1.) If annular space 88 is excessively thin (<10% of the cross sectional area of the cylinder cavity), retraction of the cylinder will not be powerful enough. On the other hand, when it is too wide (exceeds 60% of the cross sectional area of the cylinder cavity) the cylinder begins to behave like a conventional hydraulic cylinder.

Figure 23:
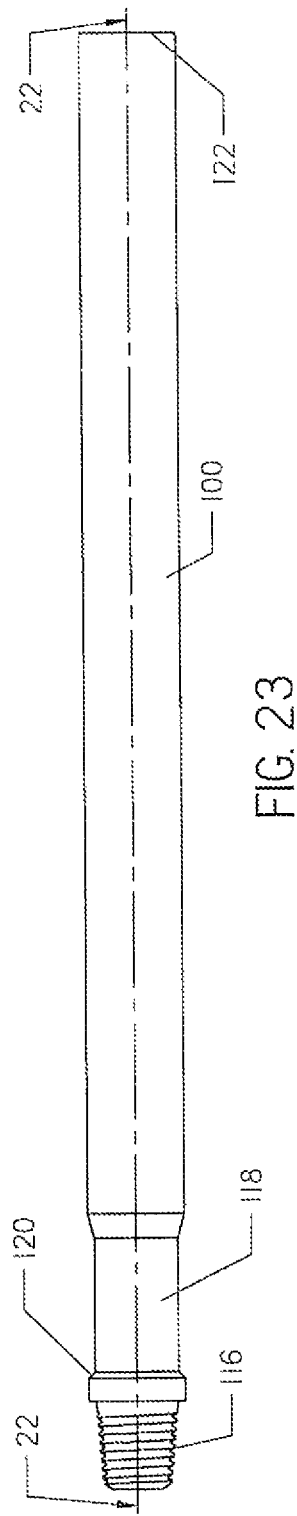
FIG. 23 is a side view of a rod section used in the invention.
Figure 24:
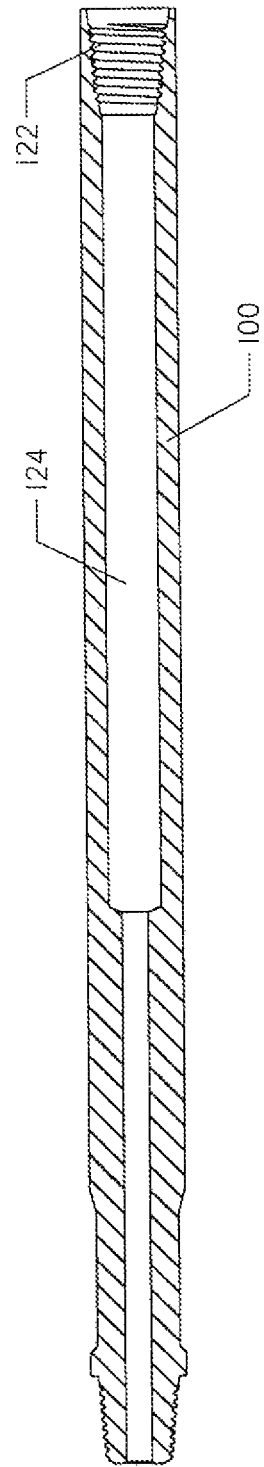
FIG. 24 is a lengthwise sectional view of the rod shown in FIG. 23.

FIGS. 23 and 24 show a preferred form of drill rod 100 of the type used to make rod string 11. Multiple rods 100 are joined together end-to-end to create a string 11 as long as 500 feet or more. Male thread 116 mates into the next rod's female thread 122. An undercut 118 is provided for jaws 72 to grip. Should the axial load he high, the rod 100 may slip until a shoulder 120 contacts jaw 72. Jaws 73 engage the outer surface of each rod 100 outside of female thread 122. An axial bore 124 of rod 100 is optionally used conduct fluid from the downhole machine to the front of the rod string. Bore 124 also reduces the weight of rods 100 to facilitate manual handling.

Operation of downhole machine 10 according to the invention is as follows. A typical job will involve pushing a rod string out through an existing pipeline from the exit pit (where machine 10 is) to the entry opening in the pipeline, such as in a trench or manhole. To extend a rod string 11, the machine 10 starts in the position shown in FIG. 3, but with no rod string 11 present. A rod 100 is removed from box 31 and placed in cradle 18 at crotch 30 with the male threaded end 116 facing shaft extension 20, which has a female thread (FIG. 14). The female end 122 is placed in rear jaws 73, and jaws 73 are closed on it. The spindle assembly 12 is then operated to thread shaft extension 20 over male end 116. Once this is done, jaws 73 are opened and spindle frame 12 is moved to the left by retraction of cylinders 26 to assume the position shown in FIG. 4. Jaws 72 are then operated to grip rod 100 at undercut 118. The spindle shaft 115 and extension 20 are then rotated in reverse to unthread extension 20 from male end 116. Cylinders 26 are then extended to move spindle frame 12 to the right to assume the position shown in FIG. 3, and the machine 10 is ready to accept another rod 100.

The procedure for adding the second and subsequent rods 100 is the same as described above, except that jaws 73 are not closed on the female end 122 of the new rod 100, and the male end 116 of the previous rod is positioned between jaws 73 as shown in FIG. 3. Instead, the female end of rod 122 is brought over male end 116 of the previous rod held in jaws 72. When spindle assembly 12 is then operated to thread shaft extension 20 over male end 116 of the new rod, female end 122 of the new rod is threaded onto male end 116 of the previous rod at the same time. In the process of retracting the cylinders 26 to assume the position of FIG. 4, the entire rod string 11 is pushed forward. This process is repeated until the leading end of string 11 emerges from the entry opening.

Once the push out operation is complete, a bursting head or other tooling is mounted on the distal end of rod string 11 in preparation for pullback through the existing hole or pipeline. Such a bursting head preferably also pulls in a replacement pipe at the same time in a manner well known in the art.

Pullback starts with vise 5 closed on neck or undercut 118 as shown in FIG. 4. Jaws 72 are opened, and cylinders 26 are extended to move spindle frame 12 to the right, pulling the rod string 11 and bursting head with it. Once spindle frame 12 has reached the position shown in FIG. 3, jaws 72 are closed on the neck 118 of the second to last rod 100, and jaws 73 are actuated by an automatic cycle that clamps female end 122 of the last rod 100 and rotates it a sufficient distance under the action of cylinder 65 to loosen the threaded joint; one-eighth to one-quarter turn is generally enough for this purpose. Jaws 73 are then opened and returned to their non-rotated position. Spindle shaft 115 is then rotated to unthread the last rod 100 the rest of the way from the second to last rod, with spindle frame 12 moving about an inch to the right during this process. Jaws 73 are then closed again on last rod 100, and spindle assembly 9 is operated to unthread last rod 100 from shaft extension 20. When this is done, jaws 73 are opened, and the last rod 100 may be manually removed and placed in storage box 31. Rods 100 are sized to be lifted and handled by one person; in this embodiment, rods 100 weigh 52 pounds each.

The pullback steps are then repeated as required until the first rod 100, having the bursting head attached thereto, is encountered. At this time, outer shore plate 19 is removed by attaching chains with hooks to openings 22, exposing center hole 28. Last rod 100 is then removed in a normal manner, resulting in a leading end portion 91 of bursting head 92 held in jaws 72. Shaft extension 20 is then threaded onto bursting head 92, and jaws 72 remain closed. Cylinders 26 are then extended, pulling back bursting head 92 through hole 28 into the position shown in FIG. 5. Vise assembly 15 travels back as well because it is locked to bursting head 92 by jaws 72. Bursting head 92 is then unthreaded from shaft extension 20 and jaws 72 are opened, allowing bursting head 92 to be lifted out of the pit.

In the foregoing manner, the machine 10 of the invention can be used for pipe bursting and replacement. During the pushing out step, it may often be desirable to mount a drill bit on the leading end of the drill string in order drill a pilot bore through the ground, if there is no existing pipeline to follow. The drill bit may be of the type having an angled steering face and can be steered with machine 12 using the well known push-to-steer, push-and-spin to bore straight ahead method. A known beacon assembly (not shown) comprising a transmitter and orientation sensor assembly may be supported by a beacon housing (not shown) behind the drill bit. Such beacon assemblies are capable of transmitting information used to locate the drill bit and to determine the drill bit's orientation.

The drill bit might also be needed to drill through collapsed or block portions of an existing pipeline to be replaced. The machine of the present invention is capable of performing these functions as well as pull back under much higher loads, without need for expensive high capacity roller bearings.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims. For example, while the invention has been discussed as a static bursting system, it is also possible to use a bursting or pipe splitting head capable of deliver cyclic impacts to the pipeline being burst.

What is claimed is:
1. A method of replacing an underground pipe using a downhole machine, the method comprising:
   thrusting a boring tool and a rod string through the underground pipe;

rotating the rod string and boring tool with a rotating spindle of the downhole machine to drill through a collapsed section of the underground pipe;

removing the boring tool from the rod string after the boring tool reaches an entry opening;

connecting a bursting head to the rod string;

connecting a replacement pipe to the bursting head; and pulling the bursting head and replacement pipe toward the downhole machine through the interior of the underground pipe without rotation of the spindle, rod string, or bursting head.

2. The method of claim 1 wherein the rotating spindle comprises a frame and a spindle shaft mounted in the frame for rotating the rod string, the downhole machine comprises a drive for rotating the spindle shaft and a hydraulic cylinder configured to thrust and pull the rod string, the rod string comprising a series of rods coupled to one another end-to-end, the method comprising:

disengaging a radial flange of the spindle shaft from a load flange secured to the frame during the pushing operation so that the spindle shaft may rotate when the boring tool and rod string are thrust through the underground pipe and to drill through the collapsed section of the underground pipe; and engaging the radial flange with the load flange to prevent rotation of the spindle shaft when the bursting head and replacement pipe are pulled toward the downhole machine.

3. The method of claim 2 wherein the downhole machine comprises a vise assembly including separately actuable jaws positioned to grip a rod nearest the spindle shaft and a rod adjacent the rod nearest the spindle shaft, the method further comprising rotating one set of jaws relative to another in a manner effective to uncouple a rod from the rod string.

4. The method of claim 1 further comprising biasing the spindle shaft towards a position wherein the radial flange is not in engagement with the load flange when the bursting head and replacement pipe are pulled toward the downhole machine, such that the radial flange engages the load flange when the pulling force exceeds a predetermined threshold to overcome the biasing force.

5. A method for installing a pipe underground using a downhole machine, the method comprising:

thrusting and rotating a boring tool and rod string through an existing underground pipe;

maintaining a selected grade by monitoring the location and orientation of the boring tool as the boring tool and rod string are thrust through the underground pipe;

removing the boring tool from the rod string after the boring tool reaches an entry opening;

connecting a bursting assembly to the rod string;

connecting a replacement pipe to the bursting assembly; and pulling the bursting assembly and the pipe toward the downhole machine to burst the underground pipe without rotation of the rod string or bursting assembly and to install the replacement pipe at the selected grade.

6. The method of claim 5 wherein the underground pipe comprises a collapsed section, the method further comprising rotating the rod string and boring tool to drill through the collapsed section of the underground pipe.

7. The method of claim 5 wherein the downhole machine comprises a spindle for rotating the rod string and the boring tool, the spindle comprising a frame and a spindle shaft mounted in the frame for rotating the rod string, the downhole machine comprises a drive for rotating the spindle shaft and a hydraulic cylinder configured to push and pull the rod string, the rod string comprising a series of rods coupled to one another end-to-end, the method comprising:

disengaging a radial flange of the spindle shaft from a load flange secured to the frame so that the spindle shaft may rotate when the boring tool and rod string are thrusted; and engaging the radial flange with the load flange to prevent rotation of the spindle shaft when the bursting assembly and the replacement pipe are pulled toward the downhole machine.

8. The method of claim 7 further comprising biasing the spindle shaft towards a position wherein the radial flange is not in engagement with the load flange when the bursting head and the pipe are pulled toward the downhole machine, such that the radial flange engages the load flange when the pulling force exceeds a predetermined threshold to overcome the biasing force.

9. The method of claim 7 wherein the downhole machine comprises a vise assembly including separately actuable jaws positioned to grip a rod nearest the spindle shaft and a rod adjacent the rod nearest the spindle shaft, the method further comprising rotating one set of jaws relative to another in a manner effective to uncouple a rod from the rod string.

10. The method of claim 5 the bursting assembly comprises a first bursting head and a second bursting head, the first bursting head having a diameter smaller than a diameter of the second bursting head, the method comprising bursting the existing underground pipe with the first bursting head and expanding the pilot bore with the second bursting head.

* * * * *

UNITED STATES PATENT AND TRADEMARK OFFICE
CERTIFICATE OF CORRECTION

| | | |
|---|---|---|
| PATENT NO. | : 8,979,435 B2 | Page 1 of 1 |
| APPLICATION NO. | : 13/047031 | |
| DATED | : March 17, 2015 | |
| INVENTOR(S) | : Wentworth et al. | |

It is certified that error appears in the above-identified patent and that said Letters Patent is hereby corrected as shown below:

In the Specification

Column 11, line 21, please delete "he" and substitute therefore --be--.

In the Claims

Column 14, line 42, after "5" please insert --wherein--.

Signed and Sealed this
Sixteenth Day of June, 2015

Michelle K. Lee
*Director of the United States Patent and Trademark Office*